US012026280B2

(12) United States Patent
Dash et al.

(10) Patent No.: US 12,026,280 B2
(45) **Date of Patent: *Jul. 2, 2024**

(54) AUTOMATED DATA ANONYMIZATION

(71) Applicant: Cisco Technology, Inc., San Jose, CA (US)

(72) Inventors: Gyana Ranjan Dash, San Jose, CA (US); Antonio Nucci, San Jose, CA (US); Donald Mark Allen, Colorado Springs, CO (US); Kabeer Noorudeen, Artarmon (AU); Tatiana Alexandrovna Gaponova, Moscow (RU); Konstantin Grechishchev, Moscow (RU)

(73) Assignee: Cisco Technology, Inc., San Jose, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/164,056

(22) Filed: Feb. 1, 2021

(65) Prior Publication Data

US 2021/0150060 A1 May 20, 2021

Related U.S. Application Data

(63) Continuation of application No. 15/964,876, filed on Apr. 27, 2018, now Pat. No. 10,963,590.

(51) Int. Cl.

*G06F 7/04* (2006.01)
*G06F 21/60* (2013.01)

(Continued)

(52) U.S. Cl.

CPC ........ *G06F 21/6254* (2013.01); *G06F 21/604* (2013.01); *H04L 41/0813* (2013.01)

(58) Field of Classification Search

CPC .... G06F 21/6254; G06F 21/604; G06F 21/62; G06F 21/6245; G06F 21/6227; H04L 41/0813; H04L 63/04; H04L 63/0421

See application file for complete search history.

(56) References Cited

U.S. PATENT DOCUMENTS 8,793,805 B1 * 7/2014 Johansson ........... G06F 21/6254 726/26
10,333,901 B1 * 6/2019 Bauman .................. H04L 63/20

(Continued)

OTHER PUBLICATIONS

Bednar, Unified Parsing and Information Extraction Language, IEEE, Jan. 23, 2016, pp. 131-135. (Year: 2016).*

(Continued)

*Primary Examiner* — Philip J Chea
*Assistant Examiner* — Jenise E Jackson
(74) *Attorney, Agent, or Firm* — Lee & Hayes P.C.

(57) ABSTRACT

In one example embodiment, a server that is in communication with a network that includes a plurality of network elements obtains, from the network, a service request record that includes sensitive information related to at least one of the plurality of network elements. The server parses the service request record to determine that the service request record includes a sequence of characters that is repeated in the service request record, and tags the sequence of characters as a particular sensitive information type. Based on the tagging, the server identically replaces the sequence of characters so as to preserve an internal consistency of the service request record. After identically replacing the sequence of characters, the server publishes the service request record for analysis without revealing the sequence of characters.

19 Claims, 21 Drawing Sheets

(51) Int. Cl.

| | |
|---|---|
| ***G06F 21/62*** | (2013.01) |
| ***H04L 41/0813*** | (2022.01) |

(56) References Cited

U.S. PATENT DOCUMENTS

| | | | | |
|---|---|---|---|---|
| 10,552,741 | B1 * | 2/2020 | Kenthapadi | G06F 21/6254 |
| 10,713,382 | B1 * | 7/2020 | Kenthapadi | G06F 21/6254 |
| 10,963,590 | B1 | 3/2021 | Dash et al. | |
| 2008/0118150 | A1 * | 5/2008 | Balakrishnan | G06F 21/6254 382/176 |
| 2008/0168135 | A1 * | 7/2008 | Redlich | G06F 16/282 709/204 |
| 2009/0018820 | A1 | 1/2009 | Sato et al. | |
| 2012/0036135 | A1 * | 2/2012 | Fu | G06F 21/6254 707/E17.075 |
| 2013/0103982 | A1 | 4/2013 | Chelliah et al. | |
| 2013/0152158 | A1 | 6/2013 | Yoshihama | |
| 2013/0282679 | A1 * | 10/2013 | Khin | G06F 16/258 707/698 |
| 2014/0047551 | A1 | 2/2014 | Nagasundaram et al. | |
| 2014/0181988 | A1 * | 6/2014 | Umeda | G06F 21/6254 726/26 |
| 2016/0255040 | A1 * | 9/2016 | Howe | H04L 51/212 709/206 |
| 2017/0061156 | A1 * | 3/2017 | Hamamoto | G06F 21/6254 |
| 2017/0098093 | A1 * | 4/2017 | Koo | G06F 21/552 |
| 2017/0366513 | A1 | 12/2017 | Kumaran | |
| 2018/0004978 | A1 * | 1/2018 | Hebert | G06F 16/2457 |
| 2018/0124008 | A1 * | 5/2018 | Tackabury | H04L 67/01 |
| 2018/0218173 | A1 * | 8/2018 | Perkins | G06F 21/6254 |
| 2018/0234332 | A1 * | 8/2018 | Burba | H04L 45/02 |
| 2018/0351961 | A1 | 12/2018 | Calcaterra et al. | |
| 2019/0116033 | A1 * | 4/2019 | Nicol | H04L 63/0421 |
| 2019/0141025 | A1 | 5/2019 | Mattsson et al. | |
| 2019/0188157 | A1 * | 6/2019 | Shamsaasef | G06F 9/544 |
| 2019/0238516 | A1 * | 8/2019 | Weggenmann | G06F 21/6254 |
| 2019/0258824 | A1 * | 8/2019 | Gkoulalas-Divanis | G06F 21/6254 |
| 2019/0332807 | A1 | 10/2019 | LaFever et al. | |
| 2019/0372941 | A1 * | 12/2019 | Mohammady | H04W 12/02 |
| 2020/0036725 | A1 | 1/2020 | Calcaterra et al. | |
| 2021/0036995 | A1 * | 2/2021 | Guo | H04L 63/0414 |

OTHER PUBLICATIONS

Shu et al, Fast Detection of Transformed Data Leaks, IEEE, Nov. 24, 2015, pp. 528-542. (Year: 2015).*

Chodorow, "Mongo DB: The Definitive Guide", Powerful and Scalable Data Storage 2nd Edition, O'Reilly, ISBN: 978-1-449-34468-9, May 8, 2013, 432 pgs.

Lample, et al., "Neural Architectures for Named Entity Recognition", Apr. 7, 2016, 11 pgs.

Unknown author, "LSTM Networks for Sentiment Analysis", http://deeplearning.net/tutorial/lstm.html, last accessed Jan. 26, 2018, 4 pgs.

Unknown author, "Data masking: What you really need to know before you begin", Whitepaper, Redgate, last accessed from https://assets.red-gate.com/products/dba/data-masker/data-masking-whitepaper.pdf on Jan. 26, 2018, 26 pgs.

James Clause et al., "Camouflage: Automated Anonymization of Field Data" ICSE' 11, May 21-28, 2011, 10 pages.

Anh-Tu Hoang et al., "An Indexed Bottom-up Approach for Publishing Anonymized Data", 2012 Eighth International Conference on Computational Intelligence and Security, Nov. 17-18, 2012, 5 pages.

* cited by examiner

200A

```
<?xml version="1.0" encoding="UTF-8"?>
<Service-Request>
<Service-Request-id>213457214</Service-Request-id><Current-Action><Action>
</Action><Action-Details></Action-Details></Current-Action>
<Title>Traffic pauses through 3750 interface</Title>
<Severity>1</Severity>
<Owner>jsmith</Owner>
<Status>Closed</Status>
<Company-name>COMPANY NAME</Company-name>
<Customer-Usage-Tag> </Customer-Usage-Tag>
<User-Provided-Serial-Number></User-Provided-Serial-Number>
<Company-site-name>COMPANY NAME</Company-site-name>
<Communication-Preference>EMAIL</Communication-Preference>
<Email>john.smith@email.com</Email>
<Phone>4-233-1230987</Phone>
<Creation-date>2011-06-01 16:34:34.0</Creation-date>
<Last-updated>2011-07-01 9:8:30.0</Last-updated>
<Closed-date>20011-07-01 9:8:30.0</Closed-date>
<Contract-id>282462</Contract-id>
<Contract-type>SNTP</Contract-type>
<Contract-status>INACTIVE</Contract-status>
<Entitled-Product-Serial-Number>RDT148247782</Entitled-Product-Serial-Number>
<Cisco.com-User-Name></Cisco.com-User-Name>
<Product-Name></Product-Name>
<Scrubbed-serial-Number></Scrubbed-serial-Number>
<Serial-Number-Match-Type></Serial-Number-Match-Type>
<Entitlement-Check-SN></Entitlement-Check-SN>
<Entitled-Product-SN></Entitled-Product-SN>
<Installed-Site-Name></Installed-Site-Name>
<Installed-At-Address></Installed-At-Address>
<Installed-At-City></Installed-At-City>
<Installed-At-State></Installed-At-State>
<Installed-At-Country></Installed-At-Country>
<CCIE-Number></CCIE-Number>
<Entitlement-Key></Entitlement-Key>
<Entitlement-Primary-Reason></Entitlement-Primary-Reason>
<HelpDesk-Tracking></HelpDesk-Tracking>
<Router-Node-Name>QWS3750-2</Router-Node-Name>
<User-Provided-Contract-Number></User-Provided-Contract-Number>
<User-Provided-Product></User-Provided-Product>
<Entitlement-Status></Entitlement-Status>
<B2B-Flag></B2B-Flag>
<B2B-PartnerName></B2B-PartnerName>
<B2B-PartnerTicket></B2B-PartnerTicket>
<B2B-EscalationTime></B2B-EscalationTime>
<B2B-PartnerResource></B2B-PartnerResource>
<B2B-Email></B2B-Email>
<B2B-Phone></B2B-Phone>
<RequestType></RequestType>
<ProblemCategory>LAN Switching > Cat3750, Cat2975GS</ProblemCategory>
<ProblemType>Software defect or crash where process stops working or system reboots</ProblemType>
```

```
<Note-Entry>
<Status>Internal</Status>
   <User>johndoe</User>
      <Time>2011-06-11 14:53:10.0</Time>
<Type>Requeue Reason</Type>
<NoteId>176230625</NoteId>
<Note>*Scope:3750/Version 17.6(10)EY2
Current contact:  GREGORY HOUSE

*Current Issue Status/Symptoms: Customer
has installed a new IOS image on one of the devices which did not resolve the problem.
The original image was 17.6(10)EY2_VERSION. The new image is 17.6(10)SE_VERSION.
he had not installed the new image on the 3750 for which this case is opened.

*Action Plan:requeing it to WW-LAN-SW.
*Other Notes:As the last case 610412763,which is refered in this case,that was handled by WW-LAN-SW
and It requires troubleshooting regarding VRF and routing.</Note>         <Note-Detail>
         </Note-Detail>
</Note-Entry>
<Note-Entry>
<Status>External</Status>
   <User>mjenkins</User>
      <Time>2011-06-09 17:15:10.0</Time>
<Type>Email In</Type>
<NoteId>176254727</NoteId>
<Note>From: mjenkins@cisco.com
Subject: SR 213457214 - Traffic pauses through 3750 interface

See detail note for email text</Note>         <Note-Detail>From: sarabbi@cisco.com
To: ghouse@email.com
Cc:
Subject: SR 213457214 - Traffic pauses through 3750 interface

Hi Gregory,

This is James Hugh Calum Laurie, Customer Support Engineer with TAC from Cisco
Systems.  I&apos;m sending this e-mail as the initial contact to let you know
that I have taken ownership of your Service Request (SR # 213457214),
and also to provide you my contact information.
```

```
Log Buffer (100000 bytes):
13.9.20 0059.1rts.vr32, interface Vlan4
Jun 30 10:29:06 CDT: Entering hrm_mod_sd di=2Q9 rewrt=5RJ3DJFH
Jun 30 10:29:06 CDT: Successful return from hrm_mod_sd
Jun 30 10:29:06 CDT: Entering hrm_free_sd
Jun 30 10:29:06 CDT: Successful return from hrm_free_sd
Jun 30 10:29:07 CDT: IP ARP: rcvd req src 13.25.5.199 00d0.a2122.7911, dst 13.25.9.20 Vlan4
Jun 30 10:29:07 CDT: IP ARP: ignored gratuitous arp src 13.25.5.199 00d0.a2122.7911, dst 13.25.9.20 0059.1rts.vr32, interface Vlan4
Jun 30 10:29:08 CDT: IP ARP: rcvd rep src 98.156.65.202 001d.e555.1296, dst 98.156.65.202 FastEthernet1/0/2
Jun 30 10:29:08 CDT: IP ARP: ignored gratuitous arp src 98.156.65.202 001d.e555.1296, dst 98.156.65.202 0003.5dfs.er52, interface FastEthernet1/0/2
Jun 30 10:29:08 CDT: IP ARP: rcvd req src 13.25.5.199 00d0.a2122.7911, dst 13.25.9.20 Vlan4
Jun 30 10:29:08 CDT: IP ARP: ignored gratuitous arp src 13.25.5.199 00d0.a2122.7911, dst 13.25.9.20 0059.1rts.vr32, interface Vlan4
Jun 30 10:29:08 CDT: IP ARP: rcvd req src 98.156.65.50 00e0.ed12.6ea0, dst 98.156.65.1 FastEthernet1/0/2
Jun 30 10:29:09 CDT: IP ARP: rcvd req src 13.25.5.199 00d0.a2122.7911, dst 13.25.9.20 Vlan4
Jun 30 10:29:09 CDT: IP ARP: ignored gratuitous arp src 13.25.5.199 00d0.a2122.7911, dst 13.25.9.20 0059.1rts.vr32, interface Vlan4
Jun 30 10:29:10 CDT: IP ARP: rcvd rep src 98.156.65.208 001d.e555.48b4, dst 98.156.65.208 FastEthernet1/0/2
Jun 30 10:29:10 CDT: IP ARP: ignored gratuitous arp src 98.156.65.208 001d.e555.48b4, dst 98.156.65.208 0003.5dfs.er52, interface FastEthernet1/0/2
Jun 30 10:29:10 CDT: IP ARP: rcvd req src 13.25.5.199 00d0.a2122.7911, dst 13.25.9.20 Vlan4
Jun 30 10:29:10 CDT: IP ARP: ignored gratuitous arp src 13.25.5.199 00d0.a2122.7911, dst 13.25.9.20 0059.1rts.vr32, interface Vlan4
Jun 30 10:29:10 CDT: IP ARP: rcvd rep src 98.156.65.210 001d.e555.1270, dst 98.156.65.210 FastEthernet1/0/2
Jun 30 10:29:10 CDT: IP ARP: ignored gratuitous arp src 98.156.65.210 001d.e555.1270, dst 98.156.65.210 0003.5dfs.er52, interface FastEthernet1/0/2
Jun 30 10:29:10 CDT: IP ARP: rcvd rep src 98.156.65.219 001e.7abd.da40, dst 98.156.65.219 FastEthernet1/0/2
Jun 30 10:29:10 CDT: IP ARP: ignored gratuitous arp src 98.156.65.219 001e.7abd.da40, dst 98.156.65.219 0003.5dfs.er52, interface FastEthernet1/0/2
Jun 30 10:29:11 CDT: IP ARP: rcvd req src 13.25.5.199 00d0.a2122.7911, dst 13.25.9.20 Vlan4
Jun 30 10:29:11 CDT: IP ARP: ignored gratuitous arp src 13.25.5.199 00d0.a2122.7911, dst 13.25.9.20 0059.1rts.vr32, interface Vlan4
Jun 30 10:29:11 CDT: IP ARP req filtered src 0.0.0.0 0015.235a.d0da, dst 119.224.112.68 0000.0000.0000 martian source
Jun 30 10:29:12 CDT: IP ARP req filtered src 0.0.0.0 0015.235a.d0da, dst 119.224.112.68 0000.0000.0000 martian source
Jun 30 10:29:12 CDT: IP ARP req filtered src 0.0.0.0 0015.235a.d0da, dst 119.224.112.68 0000.0000.0000 martian source
```

Figure 4:
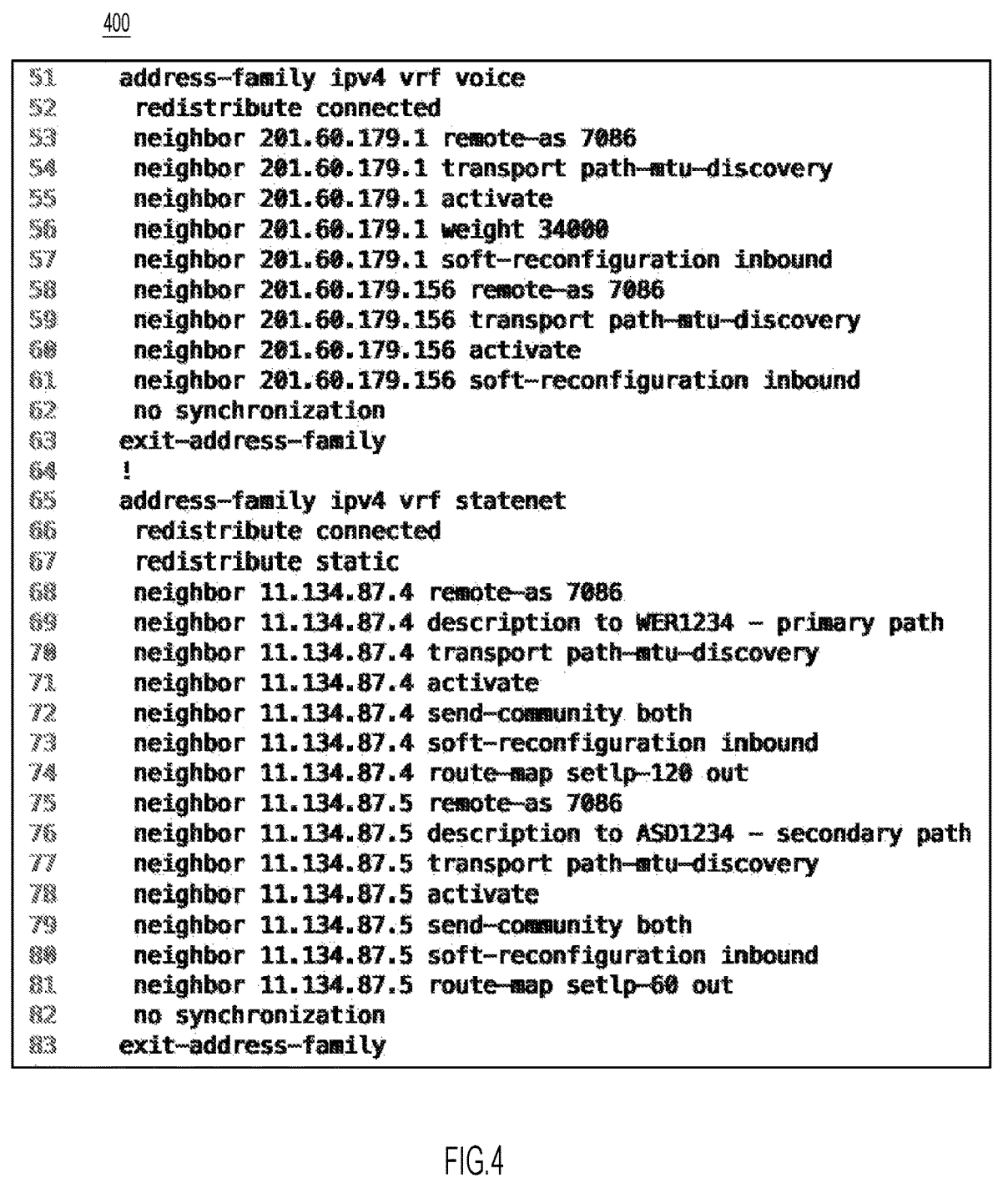

```
address-family ipv4 vrf voice
 redistribute connected
 neighbor 201.60.179.1 remote-as 7086
 neighbor 201.60.179.1 transport path-mtu-discovery
 neighbor 201.60.179.1 activate
 neighbor 201.60.179.1 weight 34000
 neighbor 201.60.179.1 soft-reconfiguration inbound
 neighbor 201.60.179.156 remote-as 7086
 neighbor 201.60.179.156 transport path-mtu-discovery
 neighbor 201.60.179.156 activate
 neighbor 201.60.179.156 soft-reconfiguration inbound
 no synchronization
exit-address-family
!
address-family ipv4 vrf statenet
 redistribute connected
 redistribute static
 neighbor 11.134.87.4 remote-as 7086
 neighbor 11.134.87.4 description to WER1234 - primary path
 neighbor 11.134.87.4 transport path-mtu-discovery
 neighbor 11.134.87.4 activate
 neighbor 11.134.87.4 send-community both
 neighbor 11.134.87.4 soft-reconfiguration inbound
 neighbor 11.134.87.4 route-map setlp-120 out
 neighbor 11.134.87.5 remote-as 7086
 neighbor 11.134.87.5 description to ASD1234 - secondary path
 neighbor 11.134.87.5 transport path-mtu-discovery
 neighbor 11.134.87.5 activate
 neighbor 11.134.87.5 send-community both
 neighbor 11.134.87.5 soft-reconfiguration inbound
 neighbor 11.134.87.5 route-map setlp-60 out
 no synchronization
exit-address-family
```

| DATA PROCESSING LOGIC 510 | CONVENTIONAL DATA PROCESSING LOGIC |
|---|---|
| disk0:asr9k-fpd-px-5.1.3 | disk0 : asr9k-fpd-px-5 .1.3 |
| RP/0/RSP1/CPU0:a90.mlpsca01.us.da | RP/0/RSP1 / CPU0 : a90.mlpsca01.us.da |
| CSCul58246-1.0.0/lib/lib_cctl_client_api | CSCul58246-1 .0.0 / lib/lib _ cctl_client_api |
| Version 12.2(58)SE2 | Version 12.2 ( 58 ) SE2 |

```
public class SRDocument {

    private String id;
    private String person;
    private String[] userIds;
    private String[] refNums;
    private String phone;
    private String[] company;
    private String contract;
    private String[] postal;
    private String rawXml;
    private String[] tokens;
    private String[] attachments;
    private String[] paragraphs;
    private Integer[] paraindices;

 ...

 }
```

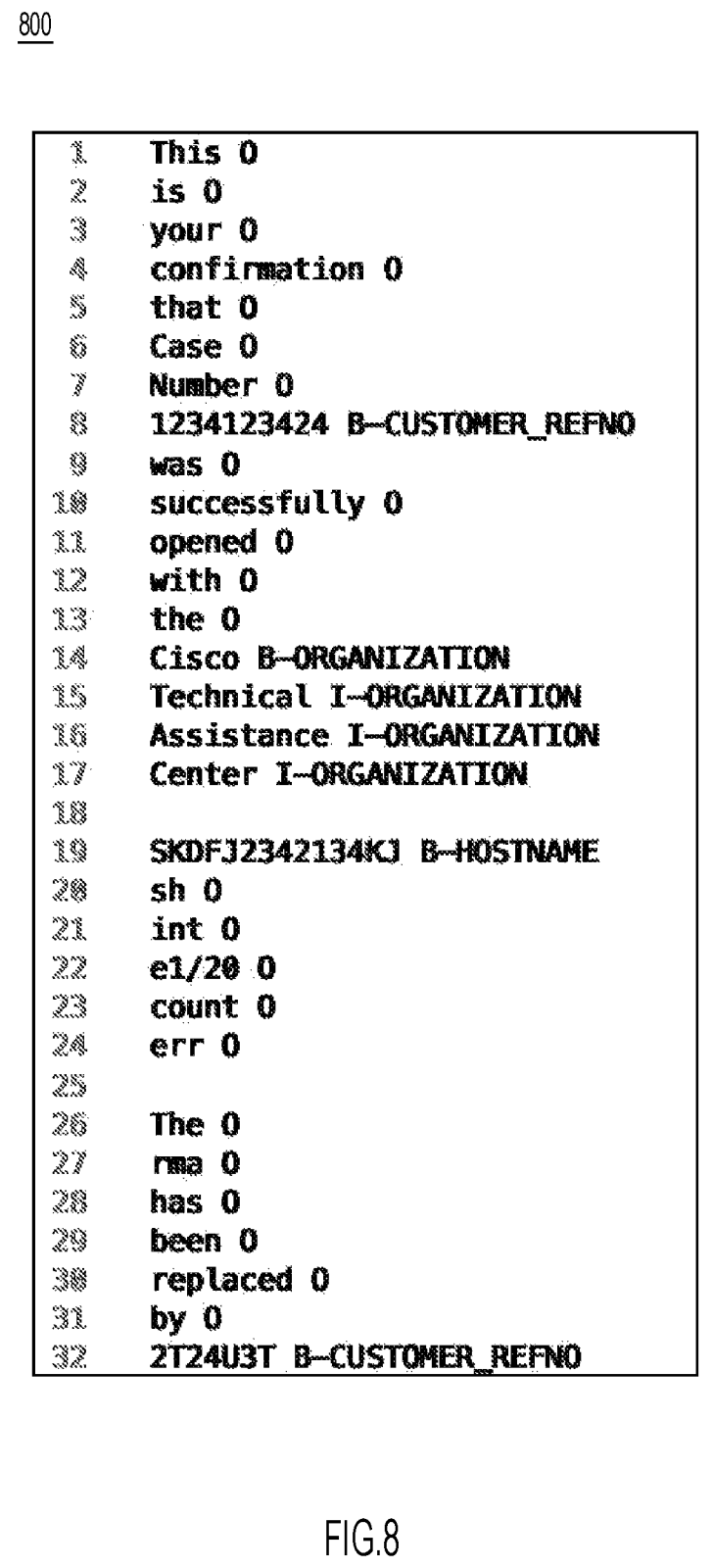

```
1   This             O
2   is               O
3   your             O
4   confirmation     O
5   that             O
6   Case             O
7   Number           O
8   1234123424       B-CUSTOMER_REFNO
9   was              O
10  successfully     O
11  opened           O
12  with             O
13  the              O
14  Cisco            B-ORGANIZATION
15  Technical        I-ORGANIZATION
16  Assistance       I-ORGANIZATION
17  Center           I-ORGANIZATION
18
19  SKDFJ2342134KJ   B-HOSTNAME
20  sh               O
21  int              O
22  e1/20            O
23  count            O
24  err              O
25
26  The              O
27  rma              O
28  has              O
29  been             O
30  replaced         O
31  by               O
32  2T24U3T          B-CUSTOMER_REFNO
```

FIG.8

```
0887  Regards,
0888  John Doe
0889  ******************************************
0890  Shift Time: 10:00 - 16:00  GMT+10 ( Monday - Friday )
0891  ******************************************
0892  Cisco TAC FrontLine Telephone Numbers:
0893  North American number: (800) 123 1234
0894  EMEA:     +32 2 231 22 11
0895  Asia-Pacific: +61 2 3231 2314
0896  Australia: 1800 532 521
```

900

1000

The last incident occurred 06/11 at 10:20am following a code upgrade on REL6500 switch about four hours earlier. The PBX devices that lost communication between each other were 19.14.22.92 and 19.199.7.67 off of TRP3787-1 and PAT-7109-2 respectively. Another incident also followed code upgrade (mainly the reload perhaps) by a few hours. Last winter there was a power outtage, and then a few days later these symptoms.

Hi John, Don got back indicating that all the information that you've requested has ben already provided in the TAC SR and we need the TAC owner, Michael (CCed) to get back to you on this.

Hence Michael can you please provide the inputs on the 4 points that John has asked for?

Thanks,

Mark

```
COMPANY_X is highly concerned since they have a very aggressive and tight timeframe to deploy the platforms and this
is mainly derived by the fact, that they have already signed contracts with customers for 100G connections, with
COMPANY_Y being one of those (coming from COMPANY_Z directly to COMPANY_X). Any delay in the deployment schedule would result
inability to deliver the contacted customer connections with huge commercial impact for COMPANY_X and potential delay
(or even lose) in our revenue stream(s) from the panned and forecasted purchases coming from this side of our business.
```

| | | REGEX TAGGING ALGORITHM | CONTACTS TAGGING ALGORITHM | LSTM TAGGING ALGORITHM | COLLISION RESOLUTION |
|---|---|---|---|---|---|
| COLLISION TYPE 1 | TEXT | JOHN DOE | JOHN DOE | JOHN DOE | JOHN DOE |
| | TAG | PERSON | PERSON | PERSON | PERSON |
| COLLISION TYPE 2 | TEXT | 193847218347 | 193847218347 | 193847218347 | 193847218347 |
| | TAG | CONTRACT | CONTRACT | PHONE | CONTRACT |
| COLLISION TYPE 3 | TEXT | JOHN JUNIOR | JOHN JUNIOR | JUNIOR DOE | JOHN JUNIOR DOE |
| | TAG | PERSON | PERSON | PERSON | PERSON |
| COLLISION TYPE 4 | TEXT | john.doe@cisco.com | john.doe@cisco.com | john.doe | john.doe@cisco.com |
| | TAG | EMAIL | EMAIL | PERSON | EMAIL |

AUTOMATED DATA ANONYMIZATION

CROSS REFERENCE TO RELATED APPLICATION

This application is a continuation of U.S. patent application Ser. No. 15/964,876, filed Apr. 27, 2018, the entirety of which is incorporated herein by reference.

TECHNICAL FIELD

The present disclosure relates to automated data protection.

BACKGROUND

Computer networking equipment manufacturers and telecommunications service providers supply hardware and software products for hundreds of thousands of customers (e.g., business entities) worldwide. Service providers typically provide customer support to handle customer inquiries regarding technical issues with these products. For example, service providers may employ thousands of full-time technical assistance engineers to assist customers who are experiencing technical issues of hardware and software.

BRIEF DESCRIPTION OF THE DRAWINGS

FIGS. 2A and 2B are excerpts of a service request document that includes records of service request communications between a customer and a technical support/assistance center, according to an example embodiment.

FIG. 3 is an excerpt of a log file of the service request document of FIGS. 2A and 2B, according to an example embodiment.

FIG. 4 is an excerpt of a configuration file of the service request document of FIGS. 2A and 2B, according to an example embodiment.

FIG. 6 is a table comparing outputs of a data preprocessing process presented herein with outputs of a conventional data preprocessing process, according to an example embodiment.

FIG. 7 illustrates a service request document object, according to an example embodiment.

FIG. 8 is an excerpt of training data tagged in Inside-Outside-Beginning (JOB) format, according to an example embodiment.

FIG. 10 is another excerpt of the service request document of FIGS. 2A and 2B, according to an example embodiment.

FIGS. 11A and 11B are further respective excerpts of the service request document of FIGS. 2A and 2B, according to an example embodiment.

FIG. 12 is a table illustrating the resolution of various tagging collisions, according to an example embodiment.

DESCRIPTION OF EXAMPLE EMBODIMENTS

Overview

In one example embodiment, a server is in communication with a network that includes a plurality of network elements. The server obtains, from the network, a service request record that includes sensitive information related to at least one of the plurality of network elements. The server parses the service request record to determine that the service request record includes a sequence of characters that is repeated in the service request record, and tags the sequence of characters as a particular sensitive information type. Based on the tagging, the server identically replaces the sequence of characters so as to preserve an internal consistency of the service request record. After identically replacing the sequence of characters, the server publishes the service request record for analysis without revealing the sequence of characters.

Example Embodiments

Figure 1:
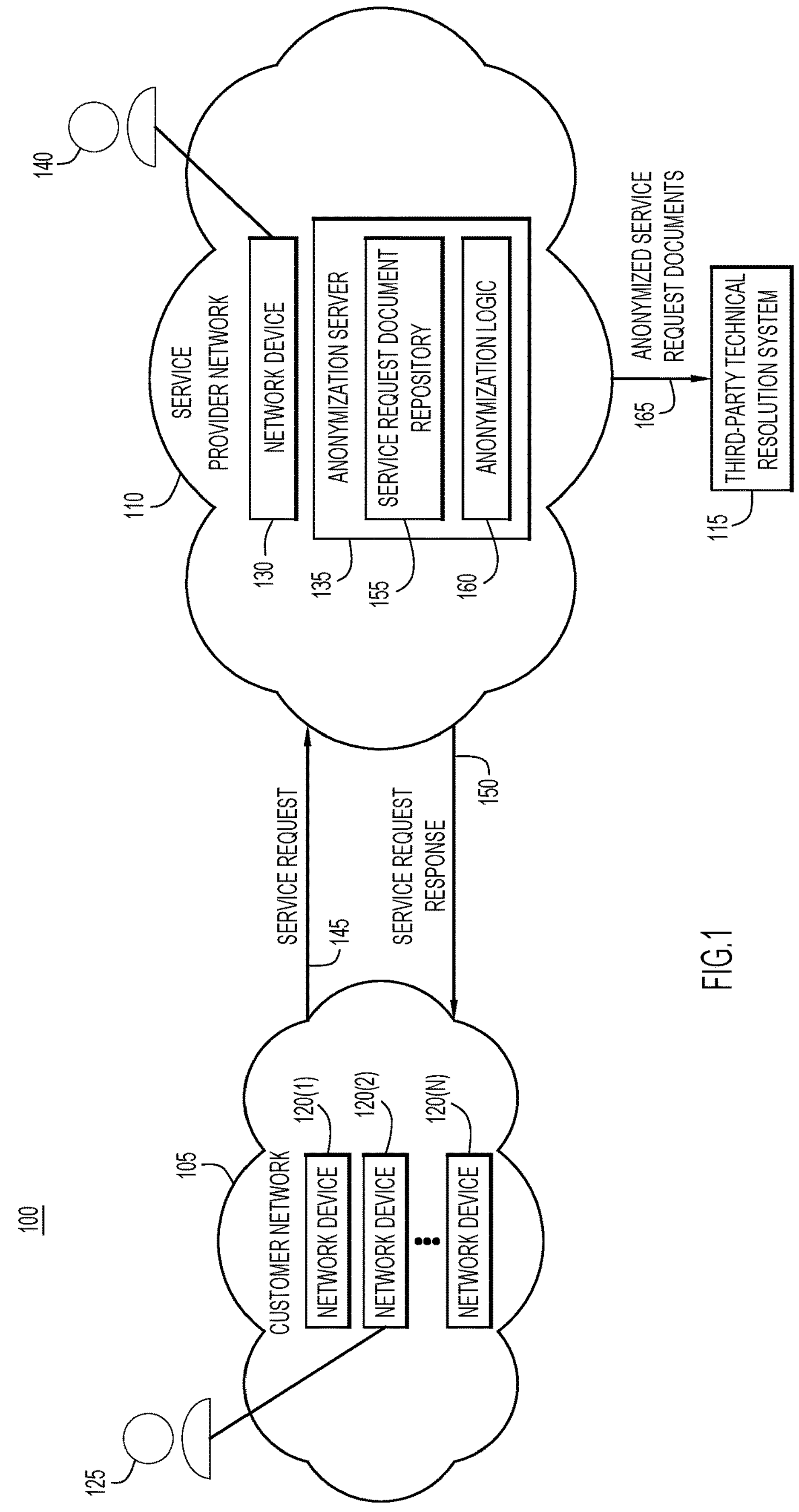
FIG. 1 is a block diagram of a system configured for automated data anonymization associated with networking equipment in a customer network, according to an example embodiment.

With reference made to FIG. 1, shown is a system 100 configured for automated data anonymization. The system 100 includes a customer network 105, a service provider network 110, and third-party technical resolution system 115. The customer network 105 includes network devices 120(1)-120(N). A network administrator 125 interacts with customer network 105 via network device 120(2), for example. The service provider network 110 includes at least one network device 130 and an anonymization server 135 in communication with customer network 105. A technical assistance engineer 140 interacts with the service provider network 110 via network device 130.

In one example, the network administrator 125 determines that customer network 105 (e.g., network device 120(1)) is experiencing a technical issue. This is a very simplified example, and in a real customer network, there could be hundreds or thousands of network devices of different types, many of which may be experiencing one or more technical issues that are causing abnormal or undesired behavior in the customer network 105.

Because network administrator 125 does not have the expertise required to resolve the technical issue alone, network administrator 125 sends (via network device 120 (2), for example) a service request 145 to service provider network 110. The service request 145 may include sensitive information related to one or more of network devices 120(1)-120(N), such as configurations of the network devices, topologies as to how the network devices are connected, addresses of interfaces of the network devices, etc.

The anonymization server 135 may obtain the service request 145 and process the service request 145 to determine (e.g., automatically determine, help the technical assistance engineer 140 determine, etc.) one or more changes to be made to a configuration of network device 120(1). The technical assistance engineer 140 may retrieve the service request 145 from the anonymization server 135 (e.g., via network device 130), and determine a possible resolution to the technical issue in the customer network 105.

The technical assistance engineer 140 may send a service request response 150 to the network administrator 125. The service request response may include the possible resolution to the technical issue, and may also include sensitive information related to one or more of network devices 120(1)-120(N). For example, the service request response 150 may include one or more changes to be made to the configuration of network device 120(1).

Once the technical issue has been resolved, a service request document/record may be constructed. The service request document provides a record of the technical issue and how the technical issue was resolved, and may include one or more service request communications (e.g., service request 145 and service request response 150). The service request document may further include several supplementary attachments, such as log and configuration files. In one example, the service request 145 includes an attached log file and an attached configuration file to help the technical assistance engineer 140 correctly classify and troubleshoot the technical issue. The service request document may contain sensitive customer information, such as contact information, network topologies, IP addresses, hostnames, configurations, logins/passwords, etc.

The anonymization server 135 may receive and store the service request document in service request document repository 155. The technical assistance engineer 140 may retrieve the service request document from the service request document repository 155 for help in resolving similar, subsequent service requests. However, even with the help of previous service request documents, technical assistance engineer 140 may not be able to efficiently resolve the technical issue on customer network 105 due to the large number of potentially relevant variables.

As such, it would be beneficial to share service request documents with third-party technical resolution systems (e.g., automated processes running on servers of private companies or cloud providers, academics, etc.) having specific capabilities for addressing (identifying a solution for) certain technical issues. Publishing service request documents would lead to improved innovation, analysis, and pattern detection of technical issues and resolutions for those technical issues. This data-driven approach would enable technical assistance engineers to improve technical issue resolution rates and response times, thereby improving the operability of customer networks.

Currently, publishing service request documents is not feasible because this would expose customer networks to malicious threats/attacks due to the sensitive information contained therein (e.g., contact information, network topologies, IP addresses, hostnames, configurations, logins/passwords, etc.). For example, a bad actor may use the sensitive information in a service request document to carry out a malicious attack on the customer network.

Moreover, conventional approaches to anonymizing sensitive information would negatively impact the internal structures/relationships of the sensitive information within the service request document itself. For instance, a service request document that describes a technical issue related to the topology of a customer network cannot be anonymized using conventional approaches without destroying the description of the network topology in the service request document.

In one specific example, a configuration file might describe the topology of the customer network with reference to the IP addresses of customer network devices. This configuration file may disclose that a first customer network device is in communication with a second customer network device, and then later disclose that the first customer network device is also in communication with a third customer network device. Because the same first customer network device is mentioned twice in the configuration file, conventional data anonymization techniques would anonymize the first and second mentions of the IP address of the first customer network device differently. That is, after the service request document has been conventionally anonymized, a third-party technical resolution system would incorrectly infer that two different customer network devices are in communication with the second and third customer network devices, respectively. Thus, conventional data anonymization techniques are unable to anonymize a service request document with repeated sensitive information without also rendering the service request document useless to a third-party technical resolution system.

In addition, conventional approaches are generally rule-based, and are not scalable for a wide variety of network, location, and user data (e.g., unstructured text). Rule-based approaches cannot automatically identify all sensitive data in a generic service request document. For example, the most popular sensitive information that occurs in attachments files (both log and configuration files) are IP addresses, Media Access Control (MAC) addresses, and hostnames. In the vast majority of cases, IP addresses (both IPv4 and IPv6 address formats) and MAC addresses can be unambiguously identified by regular expressions (rules-based) because IP and MAC addresses have well-defined structure. However, hostnames can only be partially covered by regular expressions because the hostname can contain any digit, letter, and/or other special symbol in any arbitrary order. Login names, passwords, and domain names are also difficult for conventional approaches to identify as containing sensitive information.

In certain cases, the context surrounding a hostname is described by regular expressions. For example, in many configuration files, hostnames follow phrases such as "destination list" and "hostname" or before phrases such as "uptime is". However, because there is no formal and exhaustive specification of hostname grammar, the context may not be properly analyzed using simple rule-based regular expressions. Too many corner cases would be missed, affecting the overall accuracy in detecting hostnames. In other words, rule-based approaches cannot reliably refer to a generic context surrounding a hostname to properly identify that hostname, particularly in unstructured text.

Although conventional Natural Language Processing (NLP) techniques can be applied to assist in anonymizing unstructured text in a service request document, the wide scope of sensitive information present in these service request documents renders these techniques suboptimal. For example, these service request documents may include IP addresses, MAC addresses, and hostnames as well as other customer identifiable information (e.g., person names, organization names, postal addresses, email addresses, phone numbers, user identifier (ID) and passwords, reference and contract numbers, etc.).

Such sensitive information (e.g., customer identifiable information) should be accurately anonymized prior to it being used or shared with other entities, in order to avoid compromising customers. However, no robust rule-based approach exists to accommodate all such information because the information appears in seemingly arbitrary places and in seemingly arbitrary order. Although the appearance of this information is not truly arbitrary, the underlying governing dependencies are very sophisticated and might never be expressed explicitly. As a result, regular expressions and rule-based heuristics, even those using conventional NLP techniques, cannot be used to accurately solve this problem.

Accordingly, anonymization logic 160 is provided on anonymization server 135. Briefly, the anonymization logic 160 may be configured to cause the server 135 to automatically anonymize (e.g., identically replace the sensitive information of) the service request document(s) stored in service request document repository 155 in order to generate anonymized service request documents 165. In particular, the anonymization server 135 may leverage rule-based approaches and/or extra intelligence (e.g., supervised learning techniques) to identify sensitive information that is repeated in a service request document.

The anonymization server 135 may obscure repeated sensitive data (e.g., a repeated sequence of characters) in such a way that the anonymized service request documents 165 cannot be used by bad actors to attack a network, but nonetheless are amenable to meaningful analysis by the third-party technical resolution system 115. For example, anonymization server 135 may identically replace repeated sensitive information to maintain an accurate and consistent description of a topology of a customer network while successfully anonymizing the hostnames of the customer network devices.

After identically replacing the sequence of characters, the anonymization server 135 may publish the anonymized service request documents 165 for a third-party technical resolution system 115 to analyze without revealing the repeated sensitive information. By preserving the internal consistency of the service request documents 165, third-party technical resolution system 115 may successfully analyze a given one of the anonymized service request documents 165 without obtaining a sequence of characters that is repeated in the anonymized service request document. It will be appreciated that it may only be necessary/desirable to identically replace the sensitive information that would be useful to the third-party technical resolution system 115. For example, there may be no need to preserve consistency in personal names because the relations between people are not relevant for the third-party technical resolution system 115 to analyze the anonymized service request documents 165. The same may apply to organization names, postal addresses, and other sequences of characters.

FIGS. 2A and 2B illustrate excerpts 200A, 200B of an example service request document. As shown in FIG. 2A, the service request document includes several Extensible Markup Language (XML) tags that capture meta-information regarding the service request 145, such as contact details of the network administrator 125 and specific details about the technical issue encountered by the network administrator 125. As shown in FIG. 2B, the service request document also includes the actual service request communication(s) between the network administrator 125 and technical assistance engineer 140 (e.g., service request 145 and service request response 150). The service request communications may be enclosed in note entry tags to preserve the original, unstructured, natural language text of the service request 145 and service request response 150. These excerpts may include sensitive customer information, such as contact information, relationships to other companies, etc.

FIG. 3 illustrates an example log file 300, and FIG. 4 illustrates an example configuration file 400. In one example, log file 300 and configuration file 400 are respective attachments of the service request document of FIGS. 2A and 2B. Log file 300 and configuration file 400 may include sensitive information related to network devices 120(1)-120(N). For example, the log file 300 may include Internet Protocol addresses and/or hostnames of network devices 120(1)-120(N). Configuration file 400 may reveal a topology of customer network 105 and configurations of network devices 120(1)-120(N). As shown, log file 300 and configuration file 400 are typically more structured than the arbitrary (unstructured) text in excerpt 200B.

Figure 5:
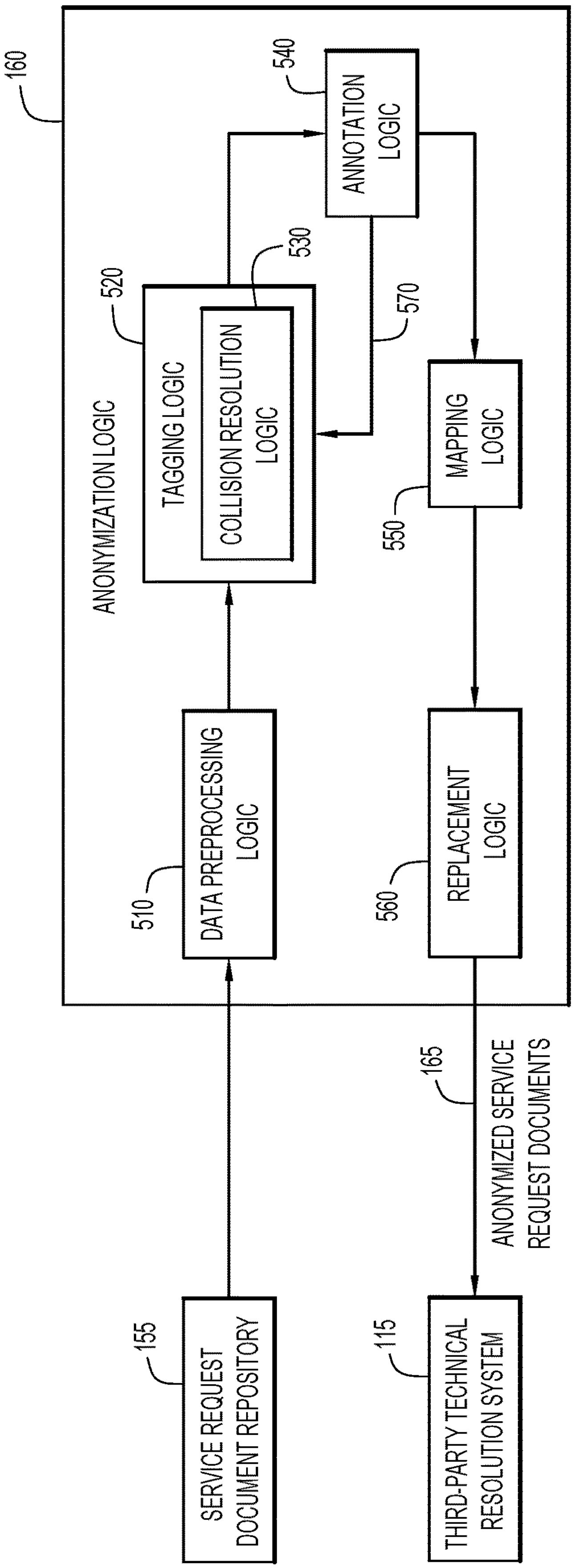
FIG. 5 illustrates an operational flow of a data anonymization process, according to an example embodiment.

FIG. 5 illustrates an operational flow of anonymization logic 160 when executed by the server 135. Anonymization logic 160 includes several functional components, including data preprocessing logic 510, tagging logic 520 (including collision resolution logic 530), annotation logic 540, mapping logic 550, and replacement logic 560. Each functional component performs one or more logical operations on the service request document.

Initially, the data preprocessing logic 510 operates on the service request document. Data preprocessing logic 510 is significant because of the Garbage In, Garbage Out (GIGO) principle of the field of data analytics (and specifically machine learning). In particular, data preprocessing logic 510 enables the reduction of the noise-to-signal ratio, thereby improving the ability to gain valuable insights from the data and make data manipulations more convenient.

Data preprocessing logic 510 may be bifurcated into (1) service request specific preprocessing, and (2) general text preprocessing. Service request specific preprocessing involves parsing raw XML strings (e.g., the XML strings shown in excerpt 200A in FIG. 2A) and transforming the strings into a service request document object. The goal of service request specific pre-processing is to extract the text of a service request document, use the structure of the XML representation to extract available meta-information that may help detect sensitive information to be anonymized, and omit information constituting noise. For example, with reference to FIG. 2A showing excerpt 200A, data preprocessing logic 510 may retain information in the phone and email fields but discard the creation date and closing date fields, as this information is neither sensitive nor significant to data anonymization.

Most of the fields of the service request document, such as user ID and phone, are self-sufficient and do not require any additional processing. As a result, these fields are maintained in the same format as provided by the service request specific preprocessing operations. However, the actual text data enclosed in the note entry tags (excerpt 200B shown in FIG. 2B) may require further processing using general text preprocessing. General text preprocessing may be important for achieving strong detection results using machine learning techniques. General text preprocessing may be performed in two steps: machine learning tagging model generation and classification. In machine learning tagging model generation, training data is used to generate a machine learning tagging model, which is then used to classify actual data. The machine learning tagging model may only need to be generated once.

General text preprocessing may involve extracting the text from each instance of the service request document note entry field. The actual text is enclosed in note entry fields, and the status, note-id, and type fields may be omitted. The text may then be split into sentences using NLP techniques (e.g., the Stanford CoreNLP package). The general text preprocessing may further involve tokenizing the sentences (i.e., dividing each sentence into pieces referred to as "tokens"). The tokens may be split on white spaces, with certain punctuation and predefined characters (e.g., '>', '"', '<', etc.) discarded. The tokens may include, alone or in combination with other tokens, sensitive information.

Tokenization should be performed with great precision because many punctuation marks appear within technical tokens. During tokenization, several cases (e.g., IP address, software version, etc.) need to be addressed, some simpler than others. For example, IP addresses are relatively simple to tokenize/preprocess because of the well-defined format of IP addresses (e.g., "10.10.10.1"). However, certain formats of software versions are more difficult to address (e.g., when the right bracket appears in the very last position of the token, this can cause confusion).

The service request document may include a sequence of characters that is repeated in the service request document. For example, the same piece of sensitive information (e.g., IP address, hostname, etc.) may appear multiple times throughout the service request document. In this case, data preprocessing logic 510 may parse the service request document to determine that the service request document includes the sequence of characters.

Data preprocessing logic 510 may skip several typical steps for text processing (e.g., stop word removal, cleaning, etc.) that are not particularly relevant to the problem of anonymization. For example, stop word removal is usually performed in case there is a need to extract a distilled representation from the text. This is unrelated to anonymizing sensitive data. By refraining from performing these typical steps for text processing, data preprocessing logic 510 saves computing resources (e.g., processing power).

Once the data preprocessing logic 510 has tokenized the service request document, the anonymization logic 160 may generate a machine learning tagging model using training data, or tag the tokens using a pre-trained machine learning tagging model. If the machine learning tagging model is to be trained, the training data may be tagged in Inside-Outside-Beginning (IOB) format. In IOB format, a token may be associated with one of the letters "I," "O," or "B," as well as a label categorizing the token. For example, IOB notation imposes restrictions specifying that I-PERSON cannot be preceded by B-POSTAL or I-ORG, but only by either B-PERSON or I-PERSON, and that the sequence of tokens should always start with B-PERSON. This example may be extrapolated to any other label. The "O" label is reserved for regular tokens that do not need labeling (e.g., regular English vocabulary).

IOB format helps to disambiguate situations in which similar entities follow each other (e.g., three different company names) from situations involving a single multi-token phrase (e.g., a single, multi-token company name). For example, IOB format permits labeling three different company names as "Company_1 (B-ORG), Company_2 (B-ORG), Company_3 (B-ORG)". Without IOB notation, every token ("Company_1, Company_2, Company_3") would be labeled only as "ORG," and it would be impossible for a tagging algorithm to decide whether the sequence of tokens represents different companies or just a single company with a multi-token name.

The training data may be split into three sets (e.g., training, testing, and development). Once the machine learning tagging model has been trained (or if the machine learning tagging model is already pre-trained), the operational flow may proceed to the tagging logic 520. Tagging logic 520 may tag the tokens as belonging to one or more classifications (types) of sensitive information using the machine learning tagging model. For instance, the tagging logic 520 may tag a sequence of characters that is repeated in the service request document as a particular sensitive information type. In one specific example, the tagging logic 520 uses three different tagging algorithms, each of which processes the input data independently. Two of the tagging algorithms are rule-based, and the third tagging algorithm is based on deep learning techniques. Each tagging algorithm is described in turn as follows.

The regular expression ("regex") tagging algorithm is the first rule-based tagging algorithm, and operates on regular expressions (i.e., tokens that have a well-defined and structured form). Examples of regular expressions include IP addresses (e.g., IPv4 or IPv6), MAC addresses, emails, and Fully Qualified Domain Names (FQDNs). While certain tokens cannot be described by a rule per se, such tokens may nonetheless be tagged with the regex tagging algorithm based on the surrounding context. For example, user passwords tend to appear before the word "password," customer reference numbers tend to appear before the phrase "serial number," etc. The regex tagging algorithm may tag IP addresses, email addresses, FQDNs, passwords, customer references numbers, hostnames, etc.

The contacts tagging algorithm is the second rule-based tagging algorithm. The contacts tagging algorithm is specifically designed to tag sensitive information in the service request document, and may be used to extract contact information (e.g., names, postal addresses, company name, etc.). Although technically both the contacts and regex tagging algorithm use regular expression engines, the respective logic and objectives of these two tagging algorithms differ. More specifically, whereas the regex tagging algorithm performs tagging based on the structure of a token, the contacts tagging algorithm performs tagging based on the structure of the service request document text. As new entries are identified, new regular expressions may be created and later used when tagging unstructured text within the service request document.

The contacts tagging algorithm uses two different heuristics to perform tagging. The first heuristic leverages the email-like structure of the service request document text, which includes well-defined subject lines and signature paragraphs. Subject lines and signature paragraphs may include sensitive information that is repeated in the unstructured service request text. Subject lines and signature paragraphs are easily identifiable with a simple heuristic that takes into account the presence of certain words and phrases in the surrounding text, such as "thanks and regards", "mobile:", "eastern standard time", etc.

The second heuristic leverages the XML format of excerpt 200A (FIG. 2A) of the service request document. This XML format helps to preserve some important meta-information about the service request document, and aids the tagging logic 520 in tagging sensitive information. In particular, tagging logic 520 may identify how to tag certain sensitive information using the XML format of the service request document object (e.g., derived from excerpt 200A). The sensitive information and corresponding XML tags from which the entities may be obtained is provided as follows. In certain cases, one or more of these XML tags may be empty.

a) User IDs: <User>, <Last-updated-by >, <Owner> and <Cisco.com-User-Name> b) Customer Reference Numbers: <CSOne>, <Service-Request-id>, <User-Provided-Serial-Number>, <Entitled-Product-Serial-Number>, <Entitlement-Check-SN>, <Entitled-Product-SN> c) Names: <Contact> d) Phone: <Phone> e) Company Names: <Company-name>, <Company-site-name>, <Installed-Site-Name> f) Postal addresses: <Installed-At-Address>, <Installed-At-City>, <Installed-At-State>, <Installed-At-Country> g) Contract number: <Contract-id>

The contacts tagging algorithm may tag a phone number, a person, a user ID, a customer reference number, an organization, a postal address, a contract, a version, etc. Tagging logic 520 may tag a first occurrence of a sequence of characters based on a structure of the service request document (e.g., a signature paragraph, or XML tags derived from excerpt 200A). In response to tagging the first occurrence of the sequence of characters, the tagging logic 520 may tag a second occurrence of the sequence of characters in an unstructured portion of the service request document.

The Long Short-Term Memory (LSTM) tagging algorithm is the third tagging algorithm, and is based on deep learning techniques. The LSTM tagging algorithm allows for more sophisticated tagging than the regex and contacts tagging algorithms. Both rule-based tagging algorithms may perform tagging robustly and consistently, but may be effective only for the limited scope of well-defined and structured entities. The LSTM tagging algorithm expands the tagging coverage of tagging logic 520 to more complex tokens of sensitive information such as personal names, company names, postal addresses, software versions, hostnames, etc., which may occur in random positions in the service request document unstructured text.

Adopting a rule-based tagging algorithm would require maintaining a large database of companies and affiliated employees with which the service provider has interacted. In theory, the rule-based tagging algorithm would be able to detect the appearance of personal names and company names by comparing each token retrieved from the service request document against this database. However, in practice this would lead to high complexity in ensuring the completeness of the information stored in the database as companies (and corresponding company information) change over time. This would also require long processing times as the databases grow in size. Furthermore, even if the rule-based tagging algorithm could identify company and personal names in this manner, the rule-based tagging algorithm would be unable to accurately tag postal address tokens, which have the tendency to be highly variable and spread across multiple tokens.

To alleviate the requirement of maintaining a large database, and to improve processing speed, the LSTM tagging module uses a combination of bidirectional LSTM neural networks with a Conditional Random Filed (CRF) layer. The CRF layer overlays the LSTM to address the short-term memory aspect of traditional LSTM neural networks (i.e., the tendency to erase inter-token dependencies as the number of separating tokens increases). Long-term token dependencies are very common in service request document data sets.

A simple example is provided as follows to explain the short-term memory decaying intrinsic to the LSTM tagging module.

"The companies mentioned below are relatively new players in cryptocurrency market, they experiment with bitcoin debit cards, blockchain services, cryptocurrency wallets. Examples include Company_A, Company_B, Company_C and many others".

In this small text script, the major clue to correctly tag "Company_A, Company_B, Company_C" as company names (i.e., "companies mentioned below") is located twenty-one tokens before the actual occurrence of the company names. To properly maintain the relationship, the LSTM tagging algorithm should remember that the paragraph is discussing company names when processing "Company_A, Company_B, Company_C" (i.e., the LSTM tagging algorithm should recollect the phrase "companies mentioned below"). The LSTM tagging algorithm accomplishes this by using neurons with memory cells having an internal state and several gates responsible for "forgetting" old information and storing new information. This approach allows more precise control over the information flow. At every step, the cell state is updated to the extent that its gates agree. In the aforementioned example, the neuron may be trained to remember the phrase "companies mentioned below" for when that neuron identifies the actual company name occurrences, and to forget irrelevant information.

The LSTM tagging algorithm may be bidirectional, meaning that the data is read twice: left to right, and right to left. This property is useful because there is no single way to semantically structure a sample of text in natural language. In other words, the semantic dependencies (i.e., clues for the LSTM tagging algorithm) may be scattered across the text. In the example above, it was not necessary for the phrase "companies mentioned below" to appear before the phrase "Company_A, Company_B, Company_C". The similar identifying phrase could have occurred after the phrase "Company_A, Company_B, Company_C," or even between the actual company names. Therefore, bidirectionality ensures that the LSTM tagging algorithm has a chance to encounter and consider many potentially useful semantic dependencies.

The CRF layer operates on the sequence processed by LSTM tagging algorithm to output a final tagging decision. For example, the LSTM tagging algorithm may transform a sequence of "n" tokens into some vector H[n]. The CRF layer may take the vector H[n] as an input and output the actual tags. The CRF layer may output the tags instead of the LSTM tagging algorithm because the CRF layer allows joint-tagging decisions while the LSTM tagging algorithm operates under the assumption of independence. In particular, there are many hard restrictions in Named Entity Recognition (NER) that break this assumption of independence. In one example, the CRF layer may detect discrepancies in IOB notation by placing a low probability on IOB sequences that violate IOB restrictions, even if those violations represent some small proportion of the whole sequence.

The LSTM tagging algorithm may reflect the unique specifics of data particular to a given service provider (e.g., terms that are specific to a service provider). In one example, the training data may include ninety-seven service requests manually tagged by subject matter experts, with fifteen service requests reserved purely for testing purposes. The LSTM tagging algorithm may pre-train using the tags to later tag sensitive entities that cannot be captured by the rule-based tagging algorithms.

Tagging logic 520 includes collision resolution logic 530. Collision resolution logic 530 resolves "collisions" (e.g., parallel tag outputs for the same tokens) between two different tagging algorithms. In one example, the regex, contacts, and LSTM tagging algorithms each operate on the service request document in parallel, building on the strengths of both rule-based and deep learning techniques. Collisions may occur as the result of the parallel operation of these tagging algorithms.

Annotation logic 540 may capture, validate, process, and store annotations defined by subject matter experts (e.g., technical assistance engineer 140 shown in FIG. 1), and may further import, store and visualize machine generated annotations for validation purposes. As used herein, the term "annotation" refers to a manual tag or a validation of the tagging performed by the tagging logic 520. Briefly, the subject matter experts may annotate service request documents for training purposes. This may involve annotating untagged service request documents and/or reviewing (and possibly correcting) service request documents that have been tagged by tagging logic 520. Annotation logic 540 may provide feedback 570 to tagging logic 520 to enable tagging logic 520 to refine its tagging algorithms (e.g., the LSTM tagging algorithm).

In one example, a scalable Non Structured Query Language (NoSQL) database stores large numbers of service request documents including sensitive information, annotations metadata, service request information, and settings required for system operation. An annotation storage access layer may provide an Application Program Interface (API) to query annotation storage components. Aggregation capabilities provided by a Database Management System (DBMS) may be used to ensure efficient real-time query processing to provide data for visualization and analytics. Annotation logic 540 may integrate with other systems and/or user interfaces using an annotations Representational State Transfer (REST) API. The annotations REST API may import and export the data to a client using Hypertext Transfer Protocol (HTTP) or HTTP Secure (HTTPS) protocols. The annotations REST API may require authentication in order to ensure the security of the data.

Once the tags have been finalized via the tagging logic 520 and annotation logic 540, the mapping logic 550 may map the tags to one or more replacement rules. A replacement rules database may store a set of predefined replacement rules and respective parameters to be applied to the tagged tokens. There may be a one-to-one correspondence between a tag type and a replacement rule. A replacement rules access layer may enable the mapping logic 550 to locate and load a given replacement rule.

In one example, a sequence of characters that is repeated in a service request document may be tagged with a particular sensitive information type of a plurality of sensitive information types. In this case, the mapping logic 550 may map a plurality of replacement rules to the plurality of sensitive information types, and identify a particular replacement rule mapped to the particular sensitive information type.

The replacement logic 560 may use the replacement rule(s) to replace one or more tagged tokens. For example, the replacement logic 560 may query the mapping logic 550 to select and load the particular replacement rule to be applied to a particular tag. In a further example, the replacement logic 560 may apply the replacement rule to the annotated token(s), store the replaced/anonymized token(s), and use the anonymized token(s) and the original text of the input service request documents to produce anonymized service request documents 165.

Replacement logic 560 may identically replace a sequence of characters that is repeated in a service request document so as to preserve an internal consistency of the service request document. Anonymization context storage may maintain anonymization information in order to ensure the internal consistency of the service request document consistency. For example, if an IP address appears several times throughout a service request document, the replacement logic 560 may replace each occurrence of the IP address to the same anonymized IP address. Thus, the anonymized tokens may retain similar formatting (e.g., an anonymized IP address retains the formatting of an IP address) while maintaining referential integrity, such that identical token are replaced identically in the service request document. If mapping logic 550 identified a particular replacement rule of a plurality of replacement rules mapped to a particular sensitive information type, the replacement logic 560 may identically replace a sequence of characters tagged as the particular sensitive information type based on the particular replacement rule.

In one example, 192.168.63.13 is repeated throughout a service request document and identified as an IP address. Mapping logic 550 may map the "IP address" tag to a replacement rule for IP addresses which causes replacement logic 560 to replace all instances of the IP address 192.168.63.13 with 10.10.63.13.

FIG. 6 shows a table 600 comparing outputs of data preprocessing logic 510 to outputs of conventional data preprocessing logic. As shown, the software version "12.2 (58)" can create confusion for conventional data preprocessing logic since (58) is a valid part of the token (software version) and should not be separated from "12.2". Moreover, this case should be distinguished from the case when the sequence inside the brackets is merely an elaboration of previously provided information (with skipped whitespace), such as in the case of a user ID reported between brackets which repeats the handler of the email address appearing outside the bracket (e.g., "user@cisco.com(user)"). Unlike conventional data preprocessing techniques, which tend to split technical tokens that should remain complete, data preprocessing logic 510 fits specific cases encountered when processing the sensitive data. In particular, data preprocessing logic 510 avoids creating undesirable spaces between technical tokens using machine learning techniques.

FIG. 7 illustrates an example service request document object 700 produced by data preprocessing logic 510. Service request document object 700 includes the following fields: service request ID, original raw XML string, tokenized text, and raw attachments. The tokenized text, for example, may be produced using general text preprocessing. The service request document object 700 also includes several auxiliary fields containing meta-information obtained from default service request XML tags. The data preprocessing logic 510 may execute its parsing functions to produce service request document object 700 using the functions available in the scala.xml.XML and scala.xml.Elem libraries, which provide an effective and convenient way to perform deep XML searches.

FIG. 8 illustrates an example training data set 800 labeled in IOB format. Tagging logic 520 may learn how to tag tokens based on training data set 800. IOB format helps multi-token phrase analysis, such as "Cisco Technical Assistance Center". Specifically, IOB labels indicate the part of the phrase to which a given token belongs. For example, "Cisco Technical Assistance Center" may be labeled as "Cisco (B-ORG) Technical (I-ORG) Assistance (I-ORG) Center (I-ORG)" because "Cisco" is the beginning of the organizational phrase and "Technical Assistance Center" is inside that organizational phrase.

Figure 9:
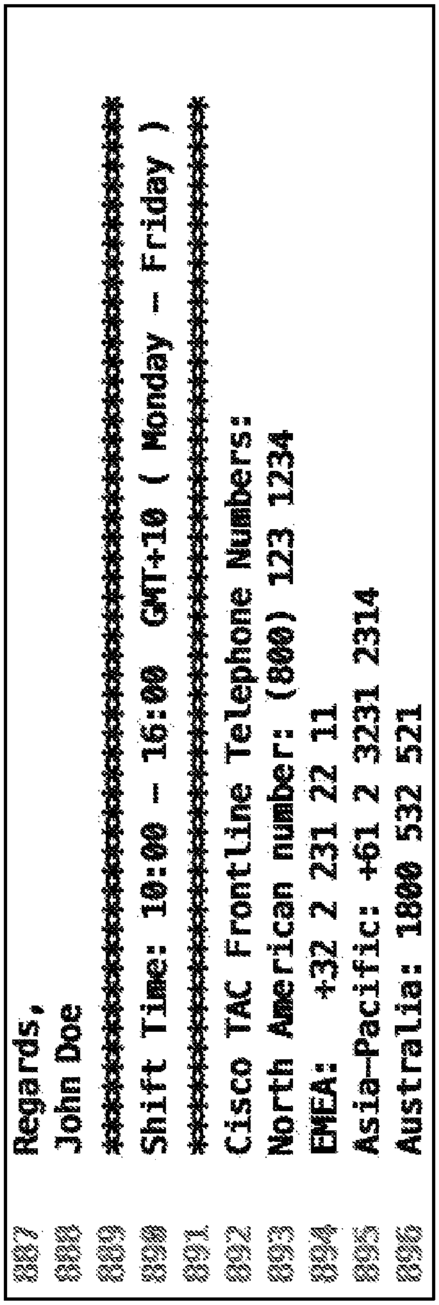
FIG. 9 is an excerpt of a signature paragraph of the service request document of FIGS. 2A and 2B, according to an example embodiment.

FIG. 9 is an excerpt of a signature paragraph 900 of a service request document. As shown, the contacts tagging algorithm may extract sensitive information from the signature paragraph 900, including a name ("John Doe") and various phone numbers. The tagging logic 520 may identify the sensitive information in signature paragraph 900, and thereafter tag that sensitive information when identified in the unstructured text (e.g., via regular expression matching).

FIG. 10 illustrates another excerpt 1000 of the service request document of FIGS. 2A and 2B. The excerpt 1000 contains four tokens of sensitive information: two IP addresses (19.14.22.92 and 19.199.7.67) and two hostnames (TRP3787-1 and PAT-7109-2). While IP addresses may be easily correctly identified and annotated using regular expressions, the discovery and annotation of the two hostnames cannot. Even though some hostnames may still be identified using techniques such as analyzing character-level properties of those tokens (e.g., digit-to-letter ratio, presence of certain symbols like underscore or hyphen, etc.), this produces high false positive rates. For example, such techniques would wrongly tag specific words such as "stackmgr-4-stack_link_change" and "ws-c3750g-16td" as hostnames. However, tagging logic 520 may successfully identify and tag hostnames using the three tagging algorithms described above (e.g., the LSTM tagging algorithm).

FIGS. 11A and 11B illustrate two excerpts 1100A and 1100B from the service request document of FIGS. 2A and 2B. These excerpts 1100A and 1100B are in English, and use no technical terms. Both excerpts 1100A and 1100B include sensitive information: excerpt 1100A includes four different personal names occurring in six different places (i.e., John, Don, Michael, and Mark), and excerpt 1100B includes three different organization names listed in four different places (i.e., COMPANY_X, COMPANY_Y and COMPANY_Z). Tagging logic 520 may identify this repeated sensitive information using the LSTM tagging algorithm to avoid maintaining an extremely large database as would be required for a solely rule-based approach.

FIG. 12 illustrates a table 1200 illustrating how collision resolution logic 530 may address at least four different types of collisions. In a first example collision type ("collision type 1"), different tagging algorithms identify the same token(s) with the same tags. For example, "John Doe" may be identified by all three tagging algorithms with the "PERSON" tag. In this example, the collision resolution logic 530 resolves this collision by tagging "John Doe" with the "PERSON" tag.

In a second example collision type ("collision type 2"), different tagging algorithms identify the same token(s) with different tags. For example, "193847218347" may be identified by the regex and contacts tagging algorithms as "CONTRACT," and by the LSTM tagging algorithm as "PHONE." In this example, the collision resolution logic 530 resolves this collision by tagging "193847218347" with the "CONTRACT" tag. This is because the more deterministic/rule-based tagging algorithms (e.g., the regex and contacts tagging algorithms) may be favored over the deep learning tagging algorithm (e.g., the LSTM tagging algorithm). Generally, these types of collisions occur between the rule-based tagging algorithms and the deep learning tagging algorithm. However, if the rule-based tagging algorithms also provide differing outputs, the collision resolution logic 530 may favor the regex tagging algorithm over the contacts tagging algorithm (and the contacts tagging algorithm over the LSTM tagging algorithm).

In one example, the token(s) in collision type 2 (e.g., "193847218347") may include a sequence of characters that are repeated in a service request document. A first tagging algorithm (e.g., regex tagging algorithm) may identify the sequence of characters as a particular sensitive information type (e.g., "CONTRACT"), and a second tagging algorithm (e.g., LSTM tagging algorithm) may identify the sequence of characters as another sensitive information type (e.g., "PHONE"). The collision resolution logic 530 may select the particular sensitive information type (e.g., "CONTRACT") identified by the first tagging algorithm (e.g., regex tagging algorithm) for tagging over the other sensitive information type (e.g., "PHONE") identified by the second tagging algorithm (e.g., LSTM tagging algorithm).

In a third example collision type ("collision type 3"), different tagging algorithms identify overlapping token(s) with the same tag. For example, "John Junior" may be identified by the regex and contacts tagging algorithms as "PERSON," and "Junior Doe" may be identified by the LSTM tagging algorithm as "PERSON." Here, the original text read "John Junior Doe," and hence "John Junior" and "Junior Doe" are overlapping because both include the characters "Junior." In this example, the collision resolution logic 530 resolves this collision by combining the text identified by the different tagging algorithms and tagging "John Junior Doe" with the "PERSON" tag.

In one example, the token(s) in collision type 3 (e.g., "John Junior Doe") may include a sequence of characters that are repeated in a service request document. A first tagging algorithm (e.g., regex tagging algorithm) may identify a first portion of the sequence of characters (e.g., "John Junior") as a particular sensitive information type (e.g., "PERSON"), and the second tagging algorithm (e.g., LSTM tagging algorithm) may identify a second portion of the sequence of characters (e.g., "Junior Doe") as the particular sensitive information type (e.g., "PERSON"). In this example, the first portion of the sequence of characters (e.g., "John Junior") overlaps with the second portion of the sequence of characters (e.g., "Junior Doe"). The collision resolution logic 530 may combine the first portion of the sequence of characters (e.g., "John Junior") and the second portion of the sequence of characters (e.g., "Junior Doe") for tagging.

In a fourth example collision ("collision type 4"), different tagging algorithms identify overlapping token(s) with different tags. For example, "john.doe@cisco.com" may be identified by the regex and contacts tagging algorithms as "EMAIL," and "john.doe" may be identified by the LSTM tagging algorithm as "PERSON." In one example, "EMAIL" tags are in the scope of the rule-based tagging algorithms only, and therefore the LSTM tagging algorithm would be unable to identify an email address. Here, the original text read "john.doe@cisco.com," and hence "john.doe@cisco.com" and "john.doe" are overlapping because both include the characters "john.doe".

In this example, the collision resolution logic 530 resolves this collision by tagging "john.doe@cisco.com" with the "EMAIL" tag. This is because the more deterministic/rule-based tagging algorithms (e.g., the regex and contacts tagging algorithms) may be favored over the deep learning tagging algorithm (e.g., the LSTM tagging algorithm). Generally, these types of collisions occur between the rule-based tagging algorithms and the deep learning tagging algorithm. However, if the rule-based tagging algorithms also provide differing outputs, the collision resolution logic 530 may favor the regex tagging algorithm over the contacts tagging algorithm (and the contacts tagging algorithm over the LSTM tagging algorithm). Collision type 4 may be the rarest type of collision.

In one example, the token(s) in collision type 4 (e.g., “john.doe@cisco.com”) may include a sequence of characters that are repeated in a service request document. A first tagging algorithm (e.g., regex tagging algorithm) may identify the sequence of characters (e.g., “john.doe@cisco.com”) as a particular sensitive information type (e.g., “EMAIL”), and a second tagging algorithm (e.g., LSTM tagging algorithm) may identify an overlapping portion of the sequence of characters (e.g., “john.doe”) as another sensitive information type (e.g., “PERSON”). The collision resolution logic 530 may select the particular sensitive information type (e.g., “EMAIL”) and the sequence of characters (e.g., “john.doe@cisco.com”) identified by the first tagging algorithm (e.g., regex tagging algorithm) for tagging over the other sensitive information type (e.g., “PERSON”) and the overlapping portion of the sequence of characters (e.g., “john.doe”) identified by the second tagging algorithm (e.g., LSTM tagging algorithm).

Figure 13:
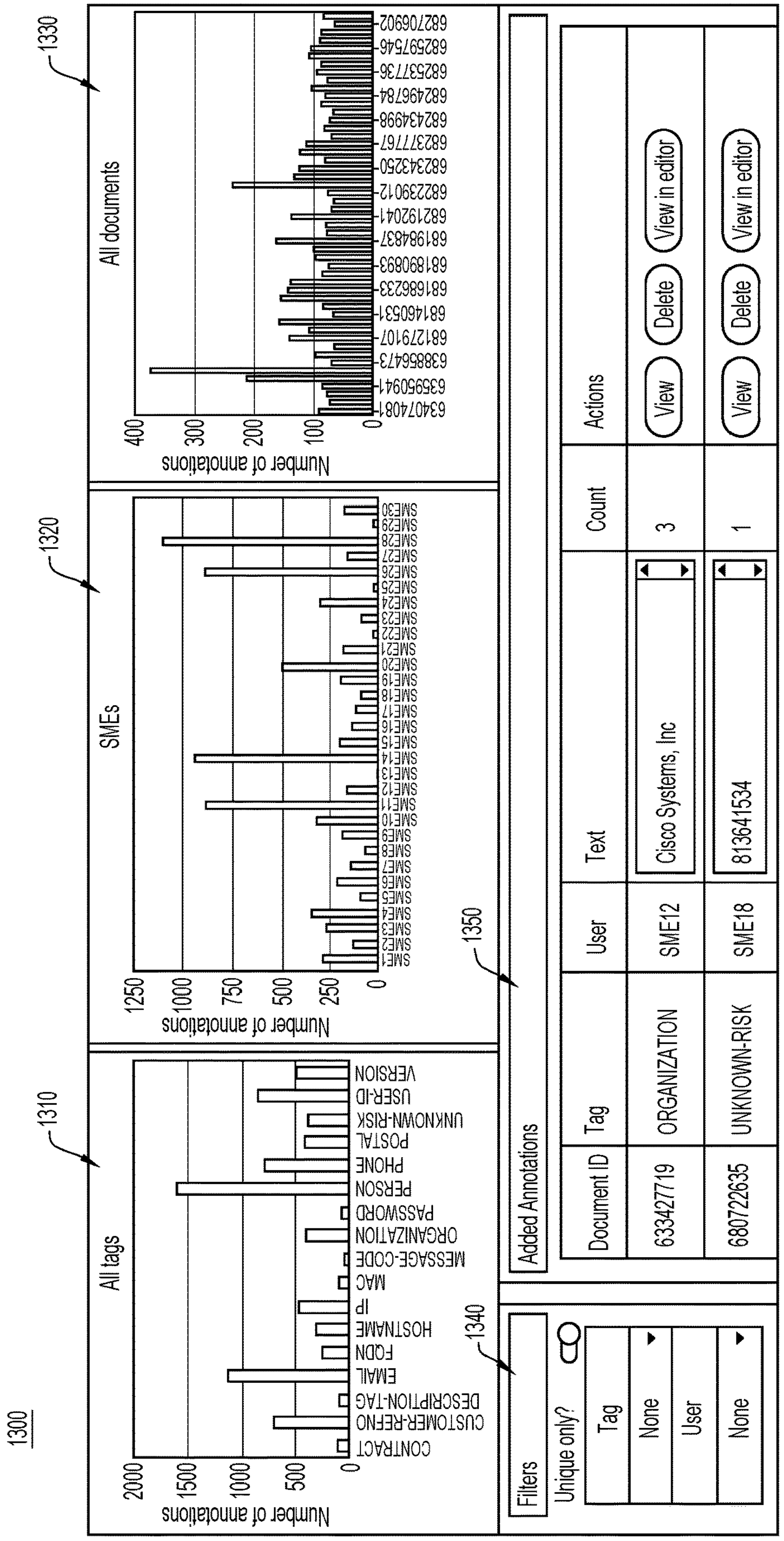
FIG. 13 illustrates a graphical user interface for visualizing automated data anonymization results, according to an example embodiment.

FIG. 13 illustrates an example Graphical User Interface (GUI) 1300 for a web annotation tool in accordance with annotation logic 540. As shown, the GUI 1300 may display service documents and annotation statistics via sections 1310-1350. Section 1310 displays a histogram of the numbers of tags applied to the service request documents by tag type. Section 1320 displays a histogram of the numbers of tags applied to the service request documents by the subject matter experts (SMEs) who created the tags. Section 1330 displays a histogram of the numbers of tags applied to the service request documents by service request document identifier. Section 1340 enables a user to toggle filters for the histograms in sections 1310, 1320, and 1330. Section 1350 indicates particular annotations that have been added to one or more service request documents.

Using GUI 1300, a subject matter expert may load service request documents including sensitive information for annotation, and search for service request documents. Subject matter experts may further view, add and remove annotations manually via the GUI 1300, and/or review machine generated annotations. The GUI 1300 may export annotations marked by subject matter experts (e.g., provide feedback 570 to tagging logic 530).

Figure 14:
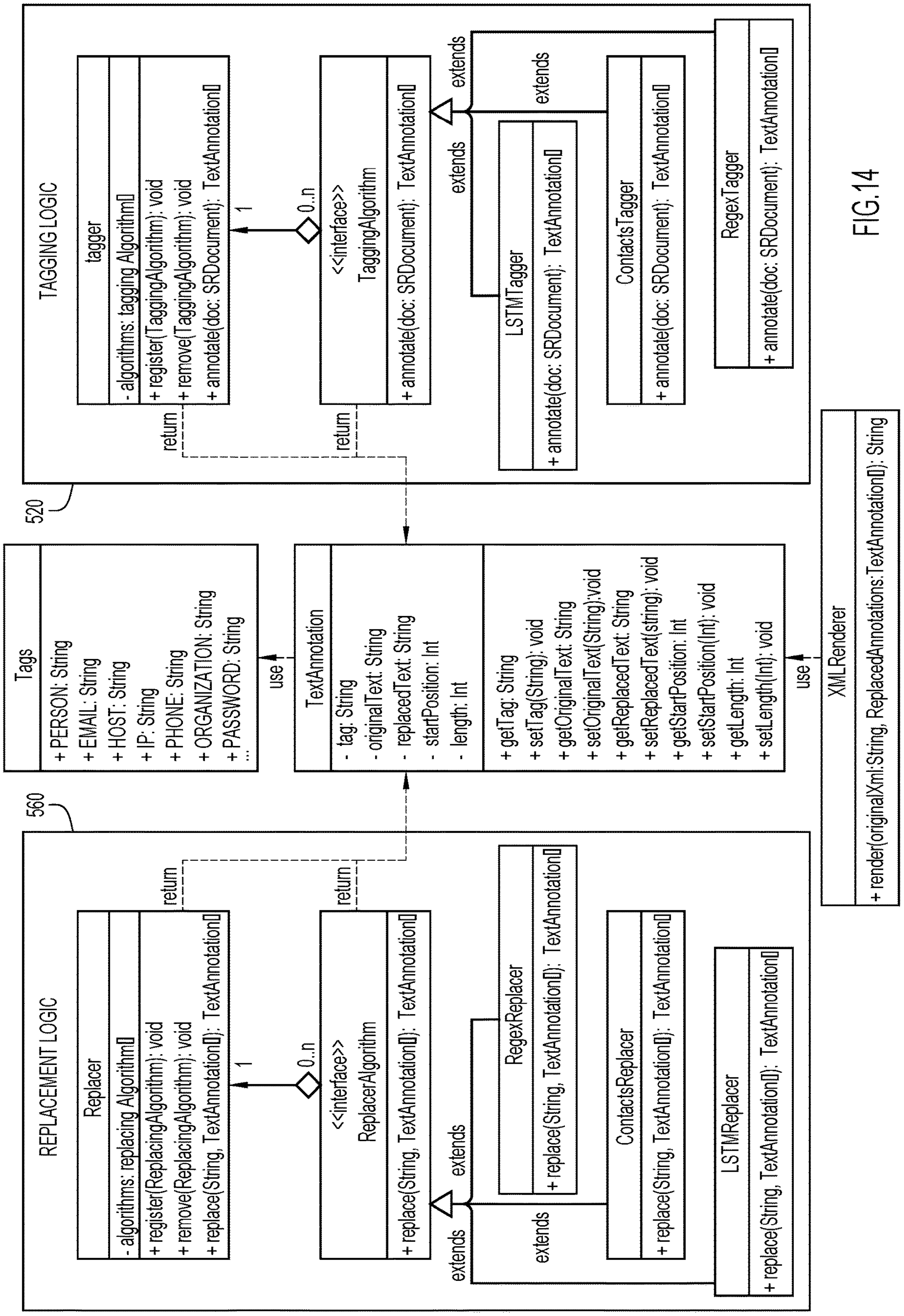
FIG. 14 is a class diagram for tagging operations and replacement operations, according to an example embodiment.

FIG. 14 is a class diagram of tagging logic 520 and replacement logic 560. Out-of-package classes may belong to a “common” package. An annotation/tag may be a text snippet with positions indicated in XML, and may be produced by one or more tagging algorithms. The tagging logic 520 may iterate over the registered tagging algorithms. The replacer may fill the “replacedText” field of the annotation/tag. The replacer may select an algorithm from the list of registered algorithms based on the tag. The replacement logic 520 and tagging logic 560 may implement strategy patterns. XMLRenderer may produce a final XML for replaced and un-replaced annotations/tags.

Anonymization logic 160 may be recall sensitive. That is, anonymization logic 160 may favor false positives (i.e., replacing non-sensitive information as sensitive information) over false negatives (i.e., failing to replace sensitive information). Anonymization logic 160 may leverage subject matter experts during the training phase to review the accuracy of the automated tagging and correct inaccurate taggings. This maximizes recall over precision. When large data sets are used during the training phase (i.e., exposing a wider sample set of tags in the service request document), very high values for both recall and precision may be achieved.

Figure 15A:
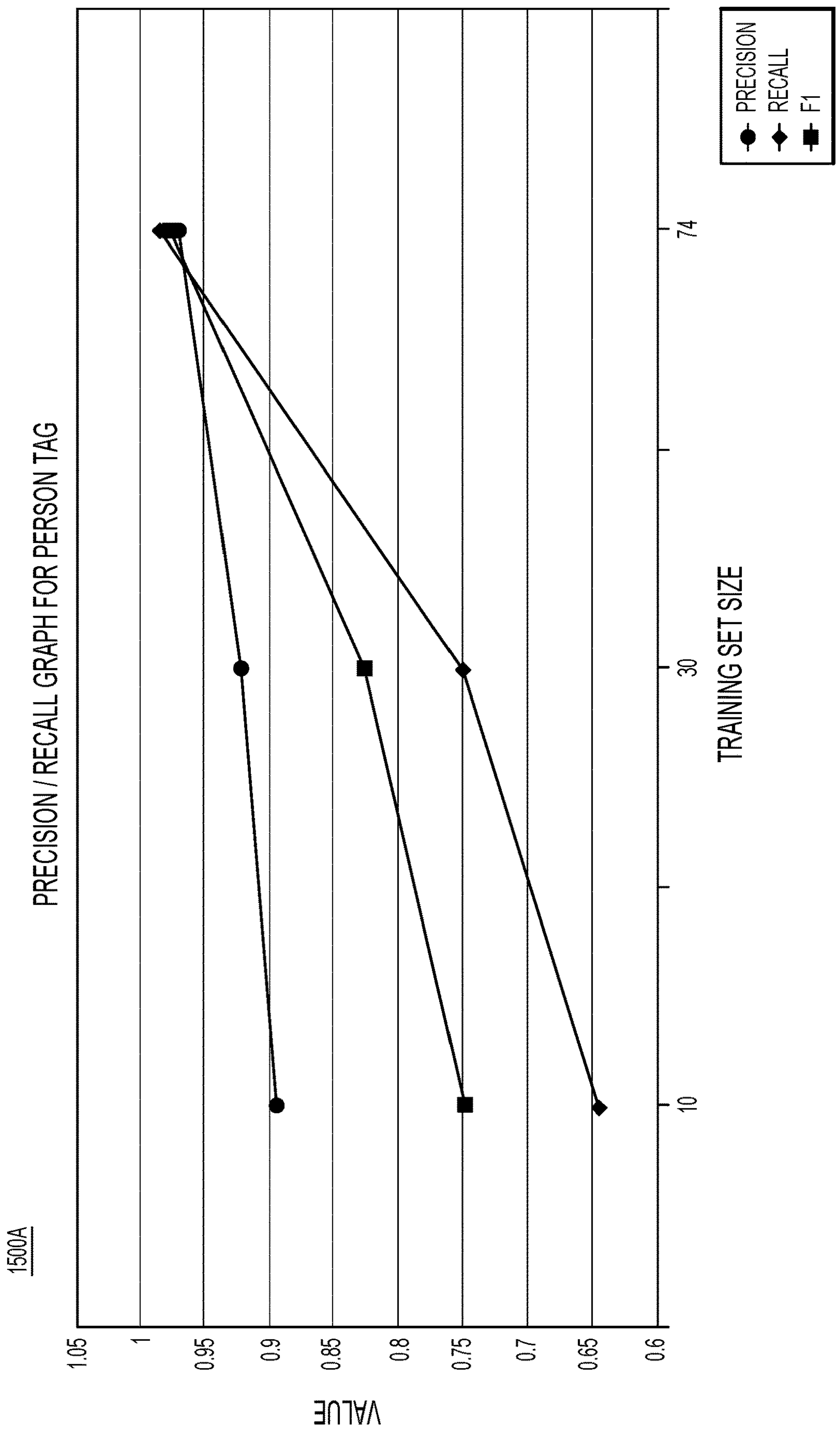
FIGS. 15A-15C illustrate precision and recall for different tags over varying training set sizes, according to an example embodiment.
Figure 15B:
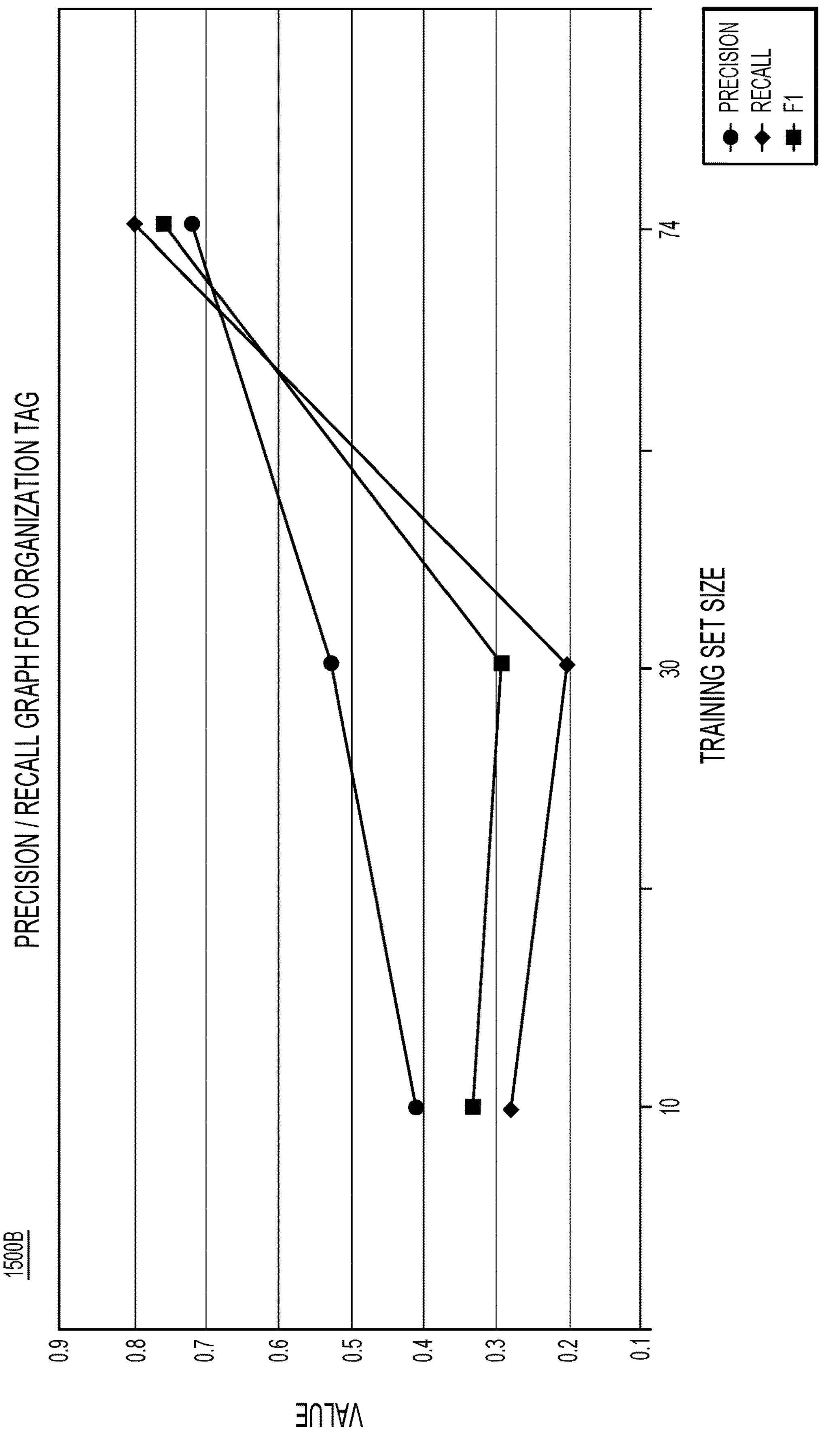
Figure 15C:
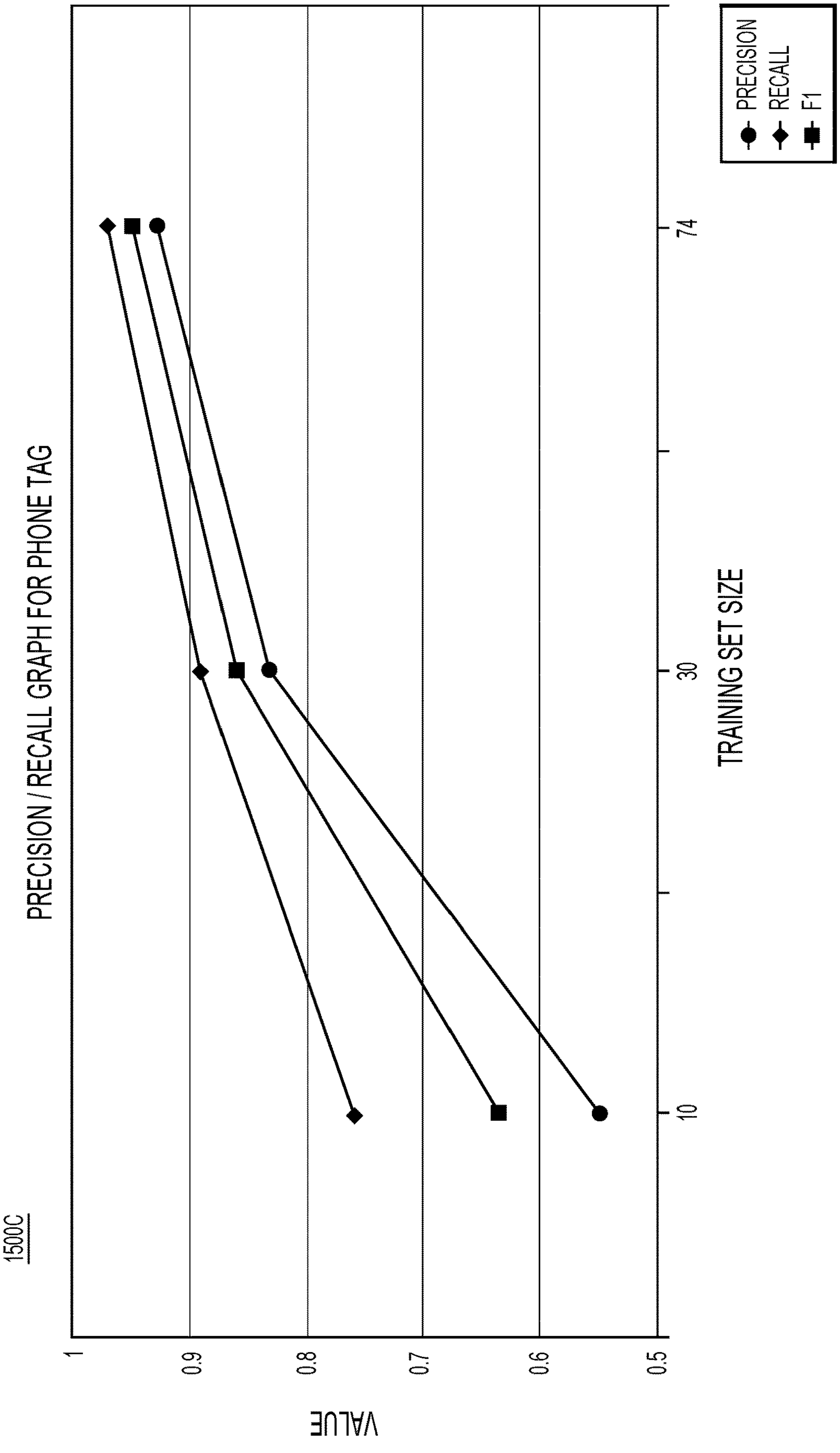

FIGS. 15A-15C illustrate respective plots 1500A-1500C showing empirical results of anonymization logic 160. These empirical results were obtained from over one hundred distinct service request documents. Each plot 1500A-1500C reports the precision, recall, and F1 metric for three distinct tags as a function of the size of the training data sets. Plot 1500A illustrates the precision, recall, and F1 metric for the “PERSON” tag, plot 1500B illustrates the precision, recall, and F1 metric for the “ORGANIZATION” tag, and plot 1500C illustrates the precision, recall, and F1 metric for the “PHONE” tag. As confirmed empirically, anonymization logic 160 is biased to ensure that high recall is achieved consistently even for small training sets where precision is low. As the training set grows in size, both precision and recall increase, achieving comparable values. Similar behavior applies for other tags. These results confirm the high accuracy levels of anonymization logic 160, for both precision and recall.

Figure 16:
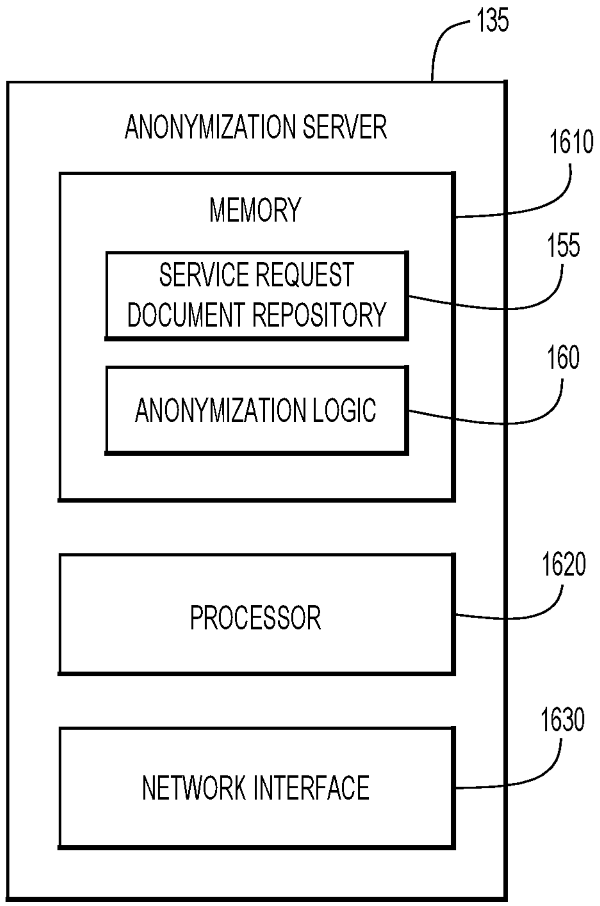
FIG. 16 is a block diagram of a computing device configured to execute automated data anonymization operations, according to an example embodiment.

FIG. 16 is a simplified block diagram of anonymization server 135 configured to implement the techniques presented herein. In this example, the anonymization server 135 includes a memory 1610, one or more processors 1620, and a network interface 1630. The memory 1610 includes service request document repository 155 and stores instructions for anonymization logic 160. The one or more processors 1620 are configured to execute instructions stored in the memory 1610 for the anonymization logic 160. When executed by the one or more processors 1620, the anonymization logic 160 causes the anonymization server 135 to perform operations described herein. The network interface 1630 is a network interface card (or multiple instances of such a device) or other network interface device that enables network communications on behalf of the anonymization server 135 for sending and receiving messages (e.g., service request 145 and service request response 150) as described above.

The memory 1610 may be read only memory (ROM), random access memory (RAM), magnetic disk storage media devices, optical storage media devices, flash memory devices, electrical, optical, or other physical/tangible memory storage devices. Thus, in general, the memory 1610 may be one or more tangible (non-transitory) computer readable storage media (e.g., a memory device) encoded with software comprising computer executable instructions and when the software is executed (by the processor 1620) it is operable to perform the operations described herein.

Figure 17:
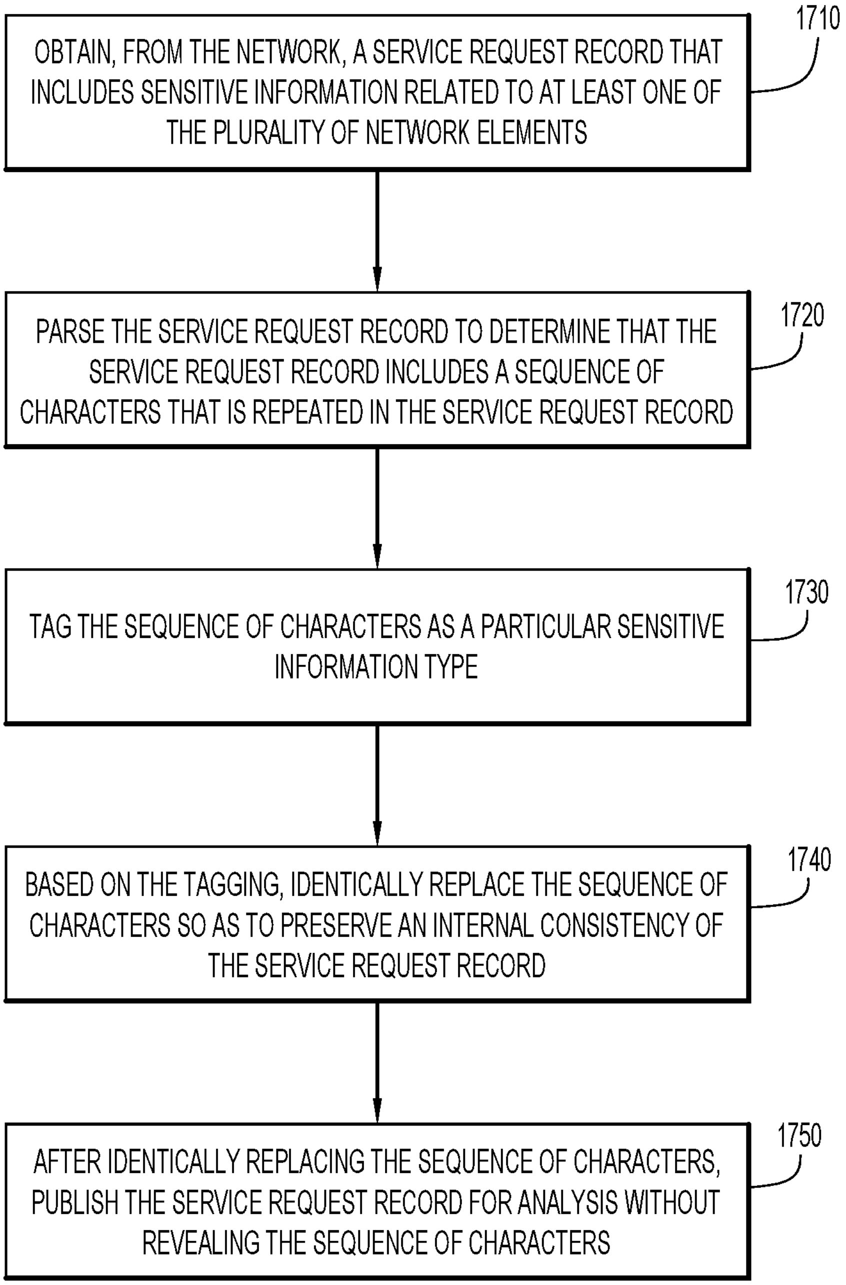
FIG. 17 is a flowchart of a method for automated data anonymization, according to an example embodiment.

FIG. 17 is a flowchart of a method 1700 for automated data anonymization in accordance with examples presented herein. The method 1700 may be performed at a server that is in communication with a network that includes a plurality of network elements. At 1710, the server obtains, from the network, a service request record that includes sensitive information related to at least one of the plurality of network elements. At 1720, the server parses the service request record to determine that the service request record includes a sequence of characters that is repeated in the service request record. At 1730, the server tags the sequence of characters as a particular sensitive information type. At 1740, based on the tagging, the server identically replaces the sequence of characters so as to preserve an internal consistency of the service request record. At 1750, after identically replacing the sequence of characters, the server publishes the service request record for analysis without revealing the sequence of characters.

Service providers may collect terabytes of data containing descriptions of different software and hardware issues that customers have encountered (e.g., service request documents) in order to efficiently resolve similar issues in the future. These techniques enable the automatic identification and anonymization of sensitive information embedded in service request documents. In one example, customer data may be scanned for sensitive information, which may be tagged for replacement. This provides an automated manner of locating all sensitive and personal information from any service request document. Data linkage in the service request document may be automated to maintain contextual relationships within the service request document so that the data can be used for any analytical application. That is, contextual relationships may be preserved to allow analysts to derive insights from the service request documents. For example, network topology and device relationship may remain intact in an anonymized document without revealing sensitive information such as hostnames. Intelligent techniques for replacing sensitive and personal information, and for maintaining the context in anonymized sensitive information for further analytical solutions, may be implemented. Advanced encryption methods (e.g., K-Anonymity, L-Diversity, etc.) may be used in conjunction with the operations described herein.

In one form, a method is provided. The method comprises: at a server that is in communication with a network that includes a plurality of network elements: obtaining, from the network, a service request record that includes sensitive information related to at least one of the plurality of network elements; parsing the service request record to determine that the service request record includes a sequence of characters that is repeated in the service request record; tagging the sequence of characters as a particular sensitive information type; based on the tagging, identically replacing the sequence of characters so as to preserve an internal consistency of the service request record; and after identically replacing the sequence of characters, publishing the service request record for analysis without revealing the sequence of characters.

In another form, an apparatus is provided. The apparatus comprises: a memory that stores instructions for automated data anonymization; a network interface configured to obtain, from a network that includes a plurality of network elements, a service request record that includes sensitive information related to at least one of the plurality of network elements; and one or more processors coupled to the memory and the network interface, wherein the one or more processors are configured to: parse the service request record to determine that the service request record includes a sequence of characters that is repeated in the service request record; tag the sequence of characters as a particular sensitive information type; based on the one or more processors tagging the sequence of characters, identically replace the sequence of characters so as to preserve an internal consistency of the service request record; and after identically replacing the sequence of characters, publish the service request record for analysis without revealing the sequence of characters.

In another form, one or more non-transitory computer readable storage media are provided. The non-transitory computer readable storage media are encoded with instructions that, when executed by a processor of a server that is in communication with a network that includes a plurality of network elements, cause the processor to: obtain, from the network, a service request record that includes sensitive information related to at least one of the plurality of network elements; parse the service request record to determine that the service request record includes a sequence of characters that is repeated in the service request record; tag the sequence of characters as a particular sensitive information type; based on the processor tagging the sequence of characters, identically replace the sequence of characters so as to preserve an internal consistency of the service request record; and after identically replacing the sequence of characters, publish the service request record for analysis without revealing the sequence of characters.

[moo] The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

at a server that is in communication with a network that includes a plurality of network elements:

obtaining, from the network, information related to at least one of the plurality of network elements;

parsing the information to identify a first occurrence of a sequence of characters and a second occurrence of the sequence of characters included in the information;

determining, by a process running on the server, that a first tagging algorithm identifies the sequence of characters as being of a first information type;

determining that a second tagging algorithm identifies the sequence of characters as being of second information type, the second information type being different than the first information type;

selecting the first information type rather than the second information type;

tagging the sequence of characters with a tag indicating that the sequence of characters is of the first information type;

based on the tag indicating that the sequence of characters is of the first information type, replacing each of the first and second occurrences of the sequence of characters with replacement characters that are in a format corresponding to the information such that a structure of the information is semantically maintained; and subsequent to replacing each of the first and second occurrences of the sequence of characters with the replacement characters, publishing the information for analysis without publishing the sequence of characters.

2. The method of claim 1, wherein the tagging includes:

tagging the first occurrence of the sequence of characters based on the structure of the information.

3. The method of claim 2, wherein the tagging further includes:

in response to tagging the first occurrence of the sequence of characters, tagging the second occurrence of the sequence of characters in an unstructured portion of the information.

4. The method of claim 1, wherein the first information type is one information type of a plurality of information types.

5. The method of claim 4, further comprising:

mapping a plurality of replacement rules to the plurality of information types; and identifying a particular replacement rule mapped to the first information type; and determining that the particular replacement rule indicates that each of the first and second occurrences of the sequence of characters are to be replaced with a same replacement characters.

6. The method of claim 1, further comprising:
processing the information to determine one or more changes to be made to a configuration of the at least one of the plurality of network elements.

7. An apparatus comprising:
a network interface configured to obtain, from a network that includes a plurality of network elements, information related to at least one of the plurality of network elements;
one or more non-transitory computer-readable media storing computer-executable instructions; and
one or more hardware processors coupled to the network interface, wherein the one or more processors are configured to execute the computer-executable instructions to:
parse the information to identify a first occurrence of a sequence of characters and a second occurrence of the sequence of characters included in the information;
determine, by a process running on a server, that a first tagging algorithm identifies the sequence of characters as being of a first information type;
determine that a second tagging algorithm identifies the sequence of characters as being of second information type, the second information type being different than the first information type;
select the first information type rather than
the second information type;
tag the sequence of characters with a tag indicating the sequence of characters is of the first information type;
based on the tag indicating that the sequence of characters is of the first information type, replace each of the first and second occurrences of the sequence of characters with replacement characters that are in a format corresponding to the information such that a structure of the information is semantically maintained; and
subsequent to replacing each of the first and second occurrences of the sequence of characters with replacement characters, publishing the information for analysis without publishing the sequence of characters.

8. The apparatus of claim 7, wherein the one or more hardware processors are configured to tag the sequence of characters by:
tagging the first occurrence of the sequence of characters based on a structure of the information.

9. The apparatus of claim 8, wherein the one or more hardware processors are further configured to tag the sequence of characters by:
in response to tagging the first occurrence of the sequence of characters, tagging the second occurrence of the sequence of characters in an unstructured portion of the information.

10. The apparatus of claim 7, wherein the first information type is one information type of a plurality of information types.

11. The apparatus of claim 10, wherein the one or more hardware processors are configured to:
map a plurality of replacement rules to the plurality of information types;
identify a particular replacement rule mapped to the sensitive first information type; and
determine that the particular replacement rule indicates that each of the first and second occurrences of the sequence of characters are to be replaced with a same replacement characters.

12. The apparatus of claim 7, wherein the one or more hardware processors are configured to:
process the information to determine one or more changes to be made to a configuration of the at least one of the plurality of network elements.

13. The apparatus of claim 7, wherein
the information for analysis without revealing the sequence of characters includes sending the information to a third-party resolution system configured to analyze the information.

14. One or more non-transitory computer readable storage media encoded with instructions that, when executed by a processor of a server that is in communication with a network that includes a plurality of network elements, cause the processor to:
obtain, from the network, information related to at least one of the plurality of network elements;
parse the information to identify a first occurrence of a sequence of characters and a second occurrence of the sequence of characters included in the information;
determining, by a process running on the server, that a first tagging algorithm identifies the sequence of characters as being of a first information type;
determining that a second tagging algorithm identifies the sequence of characters as being of second information type, the second information type being different than the first information type;
selecting the first information type rather than the second information type;
tagging the sequence of characters with a tag indicating that the sequence of characters is of the first information type;
based on the tag indicating that the sequence of characters is of the first information type, replace each of the first and second occurrences of the sequence of characters with replacement characters that are in a format corresponding to the information such that a structure of the information is semantically maintained; and
subsequent to replacing each of the first and second occurrences of the sequence of characters with replacement characters, publishing the information for analysis without publishing the sequence of characters.

15. The one or more non-transitory computer readable storage media of claim 14, wherein the instructions that cause the processor to tag include instructions that cause the processor to:
tag the first occurrence of the sequence of characters based on a structure of the information.

16. The one or more non-transitory computer readable storage media of claim 15, wherein the instructions that cause the processor to tag include instructions that cause the processor to:
in response to tagging the first occurrence of the sequence of characters, tag the second occurrence of the sequence of characters in an unstructured portion of the information.

17. The one or more non-transitory computer readable storage media of claim 14, wherein the first information type is one information type of a plurality of information types, wherein the instructions further cause the processor to:
map a plurality of replacement rules to the plurality of the information types;

identify a particular replacement rule mapped to the first information type; and determine that the particular replacement rule indicates that each of the first and second occurrences of the sequence of characters are to be replaced with a same replacement characters.

18. The one or more non-transitory computer readable storage media of claim 14, wherein the instructions further cause the processor to:

process the information to determine one or more changes to be made to a configuration of the at least one of the plurality of network elements.

19. The one or more non-transitory computer readable storage media of claim 14, wherein the information for analysis without revealing the sequence of characters includes sending the information to a third-party resolution system configured to analyze the information.

* * * * *